US007876756B2

(12) United States Patent
Muramoto et al.

(10) Patent No.: US 7,876,756 B2
(45) Date of Patent: Jan. 25, 2011

(54) PACKET TRANSMITTING METHOD, RELAY NODE AND RECEIVING NODE

(75) Inventors: Eiichi Muramoto, Kanagawa (JP); Takahiro Yoneda, Tokyo (JP); Toyoki Kawahara, Tokyo (JP)

(73) Assignee: Panasonic Corporation, Osaka (JP)

( * ) Notice: Subject to any disclaimer, the term of this patent is extended or adjusted under 35 U.S.C. 154(b) by 135 days.

(21) Appl. No.: 12/279,164

(22) PCT Filed: Feb. 16, 2007

(86) PCT No.: PCT/JP2007/052879

§ 371 (c)(1),
(2), (4) Date: Nov. 3, 2008

(87) PCT Pub. No.: WO2007/094465

PCT Pub. Date: Aug. 23, 2007

(65) Prior Publication Data

US 2009/0059924 A1 Mar. 5, 2009

(30) Foreign Application Priority Data

Feb. 17, 2006 (JP) ............................. 2006-040572

(51) Int. Cl.
*H04L 12/56* (2006.01)
(52) U.S. Cl. ...................................... 370/390
(58) Field of Classification Search ............... 370/390, 370/338, 401, 392, 400, 230, 432, 238, 244, 370/235, 399, 395, 431
See application file for complete search history.

(56) References Cited

U.S. PATENT DOCUMENTS

| 6,862,279 | B1 | 3/2005 | Imai |
| 2003/0046425 | A1 | 3/2003 | Lee |
| 2004/0218603 | A1* | 11/2004 | Lee et al. ............... 370/390 |
| 2007/0140107 | A1* | 6/2007 | Eckert et al. ............ 370/216 |

FOREIGN PATENT DOCUMENTS

| JP | 2000-354063 | 12/2000 |
| JP | 2003-69640 | 3/2003 |
| JP | 2004-297180 | 10/2004 |
| WO | 2004/043019 | 5/2004 |

OTHER PUBLICATIONS

Jiwoong Lee, "Explicit Multicast over Ethernet," [online], IETF Internet-Draft, Jan. 23, 2002, [retrieved on Mar. 13, 2007], Retrieved from the Internet : < hap : //www. watersprings. org/pub/id/draft-lee-xcast-ethernet-02. txt>, "3. Transmitting an Xcast packet over Ethernet".
Y.Imai, et al., "XCAST6: eXplict Multicast on IPv6," IEEE/IPSJ SAINT2003 Workshop 4, IPv6 and Applications, Orland, Jan. 2003, 31 pages total, p. 7, line 23.

* cited by examiner

*Primary Examiner*—Dang T Ton
*Assistant Examiner*—Nourali Mansoury
(74) *Attorney, Agent, or Firm*—Dickinson Wright PLLC

(57) ABSTRACT

A packet transmitting method wherein an explicit multicast packet can be transmitted with the consumption of communication bands of broadcast media being suppressed. According to this method, a link level multicast is used to transmit an explicit multicast packet only to next hop nodes that, even when receiving the explicit multicast packet through the link level multicast, will not output the same packet to the broadcast media, while a unicast is used to transmit an explicit multicast packet to the other next hop nodes.

9 Claims, 16 Drawing Sheets

| OBJECT NODE 401 | NEXT HOP NODE 402 |
|---|---|
| Receiving apparatus 1 IP address b1 | Router 12 IP address b |
| Receiving apparatus 2 IP address b2 | Router 12 IP address b |
| Receiving apparatus 3 IP address c1 | Router 13 IP address c |
| Receiving apparatus 4 IP address d1 | Router 4 IP address d |
| Receiving apparatus 5 IP address e1 | Receiving apparatus 5 IP address e1 |
| ......... | ......... |

| NEXT HOP NODE 411 | MAC ADDRESS 412 | LMC COMPATIBILITY 413 | CONNECTION PORT ID 414 |
|---|---|---|---|
| Router 12 IP address b | 3ffe:306:1130:100:6432:211 | 1 | 2 |
| Router 13 IP address c | 3ffe:306:1130:100:6432:212 | 1 | 2 |
| Router 4 IP address d | 3ffe:306:1130:100:6432:213 | 0 | 2 |
| Receiving apparatus 5 IP address e1 | 3ffe:306:1130:100:6432:214 | 1 | 2 |
| Transmitting apparatus IP address a1 | 3ffe:306:5555:777:4332:111 | 0 | 1 |
| ......... | ......... | ......... | ......... |

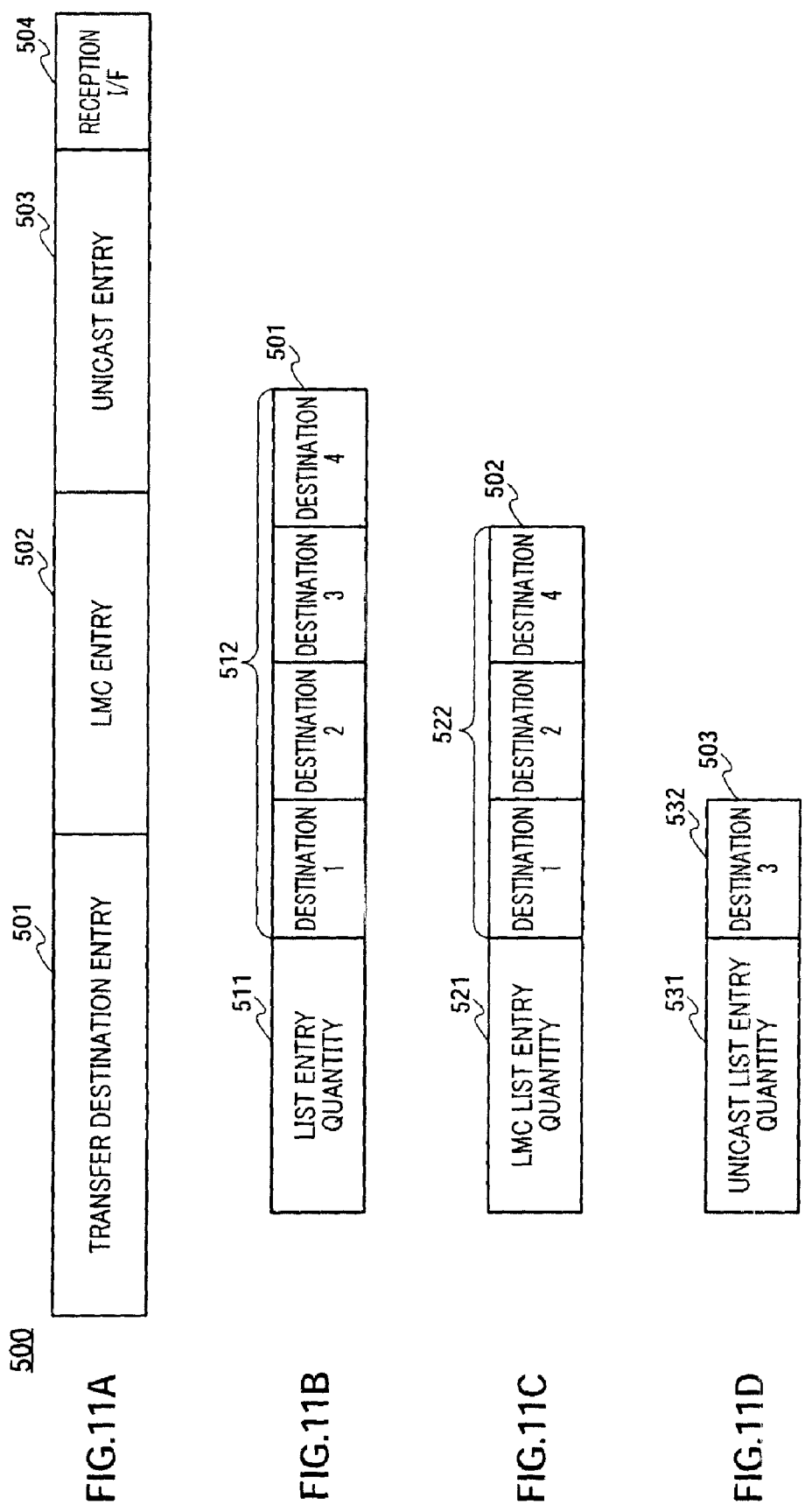

PACKET TRANSMITTING METHOD, RELAY NODE AND RECEIVING NODE

TECHNICAL FIELD

The present invention relates to a packet transmitting method, relay node, and receiving node whereby a packet is distributed efficiently to a plurality of terminals and routers via a network.

BACKGROUND ART

Conventionally, there has been an IP (Internet Protocol) multicast as a packet transmitting method of the third layer of the OSI (Open Systems Interconnection) reference model. An IP multicast is a method whereby a group IP address denoting a group of terminals is specified in the destination address field of a packet, a router that receives a packet replicates the packet appropriately, and then the packet is transmitted to a plurality of terminals beyond the router by means of transfer. With an IP multicast, a packet received by a router is finally transferred to a network to which a terminal of the destination group is connected via a plurality of routers. When an IP multicast packet is received by a certain router, the router searches its routing table and determines the transfer destination interface. If this interface is connected to a broadcast media, the packet is transferred by means of a link level multicast distribution method.

This link level multicast (hereinafter referred to as "LMC") distribution method is a distribution method whereby a multicast address is specified as the destination address in a packet of the second layer of the OSI reference model, and the packet arrives simultaneously at a plurality of terminals connected to the same broadcast media. Therefore, according to LMC, if a plurality of destination group terminals and relay routers are connected to one broadcast media, a packet can be distributed efficiently. A broadcast media is a network in which the same media (cable and frequency band) is shared by a plurality of terminals, examples being an Ethernet (registered trademark) stipulated by IEEE802.3 and a radio LAN (Local Area Network) stipulated by IEEE802 11b.

However, with an IP multicast, it is necessary to assign an IP multicast address to each distribution group, and it is difficult to cope with dynamic changes in the component nodes of a group. Furthermore, it is necessary to make IP multicast address settings in the routing tables of all the routers in a route.

Thus, the explicit multicast distribution method (hereinafter abbreviated to "XCAST") shown in Non-patent Document 1 and Patent Document 1 has been proposed as a different third layer packet distribution method.

FIG. 1 is a drawing showing the format of an XCAST (Explicit Multicast) 6 packet. This XCAST6 performs communication using IPv6 (Internet Protocol version 6) as an IP address.

As shown in FIG. 1, XCAST header (XCASTHdr) 1401 is composed of IPv6 header (IPv6Hdr) 1402 and routing header (RoutingHdr) 1403. The IP address of the transmission source node of a packet is written in IPv6 header 1402, and a multicast address indicating that this is XCAST6 is written in destination address 1405.

In routing header 1403 are written all of destination addresses 0 through n (1407) and destination ports 0 through n (1408) that are multi-point transmission destinations. In destination bit map 1406, bits are specified corresponding to destination nodes, and a distribution-unperformed destination node and distribution-completed destination node are made explicit. Specifically, "1" is set for a distribution-unperformed destination node, and "0" is set for a distribution-completed destination node. In the following description, destination bit map 1406 and destination addresses 1407 are together referred to as a "destination list".

With an XCAST, when distributing a packet to a plurality of terminals, the transmitting apparatus creates a destination list in the packet, and transmits to the first node on the destination list. When an XCAST router receives that packet, it references its routing table, and determines a transfer destination interface to a link to which a distribution-unperformed destination node in the destination list connects. Then that router replicates that packet timely, amends only a bit corresponding to a distribution-unperformed destination node in destination bit map 1406 to "1" indicating nondistribution, and then outputs the packet to a distribution-unperformed destination node positioned at the top of the destination list. When a terminal that is a destination node receives this, it amends a bit corresponding to itself in destination bit map 1406 to "0" indicating completion of distribution, and transmits that packet to a terminal that is a distribution-unperformed destination node. By this means, even though an IP multicast address is not used, it is possible to transmit the same data to terminals of a plurality of destination groups in the same way as in an IP multicast by having one packet sequentially provided to a plurality of terminals.

However, with a distribution method using an XCAST, if distribution is performed by means of a link level multicast distribution method when the transfer destination interface of a router is a broadcast media, there is a risk of a plurality of XCAST packets continuing to loop in that broadcast media. This is because a router that receives an XCAST packet attempts to transfer the received packet to a distribution-unperformed node on the destination list, and transmits an XCAST packet from the receiving interface.

Patent Document 2 discloses a method whereby distribution between XCAST-compatible routers is performed by means of a multicast as a packet distribution method that solves this problem.

FIG. 2 is a configuration diagram of a conventional IP network.

In FIG. 2, routers 1 through 4 (1501 through 1504), a transmitting apparatus (1511), and receiving apparatuses 1 through 4 (1512 through 1515) support an XCAST. The operation when the same data is transmitted from the transmitting apparatus (1511) to all the receiving apparatuses at this time will now be described using the accompanying drawings.

FIG. 3 is a sequence diagram showing a data distribution operation by means of an XCAST.

In FIG. 3, the transmitting apparatus (1511) generates an XCAST packet in which the addresses of receiving apparatuses 1 through 4 (1512 through 1515) are written in the destination list, and transmits this to router 1 (1501) (step S1601).

Next, router 1 determines a next hop node for transmitting a received XCAST packet to a distribution-unperformed destination node based on the routing table. At this time, if the link level unicast addresses of routers 2 through 4 (1502 through 1504) that are the next hop nodes are unknown, router 1 (1501) searches using a Neighbor Solicitation message and Neighbor Advertisement message.

Next, router 1 (1501) replicates the received packet for each next hop node, and amends the destination bit map so that only the bit which is corresponding to a distribution-unperformed destination node that is an object of relay by those next hop nodes becomes "1". Then a unicast address obtained by searching is set as a destination address, and an XCAST packet is transmitted to each next hop node (steps S1602, S1605, and S1607).

The contents of an XCAST packet transmitted to a next hop node from router 1 (1501) here is shown in FIG. 4.

As shown in FIG. 4A, packets to receiving apparatus (hereinafter also referred to as "R") 1 and receiving apparatus 2 are combined into one packet with router (hereinafter also referred to as "RT") 2 as the next hop node. Also, in the destination bit map, only bits corresponding to receiving apparatus 1 (R1) and receiving apparatus 2 (R2) are set to "1", and the other destination bits are set to "0". Similarly, as shown in FIG. 4B, for a packet to receiving apparatus 3 (R3), router 3 (RT3) is taken to be the next hop node, and only the bit corresponding to receiving apparatus 3 (R3) is set to "1" in the destination bit map. In the same way, as shown in FIG. 4C, for a packet to receiving apparatus 4 (R4), router 4 (RT4) is taken to be the next hop node, and only the bit corresponding to receiving apparatus 4 (R4) is set to "1" in the destination bit map.

Next, router 2, on receiving this packet, transmits it to the first distribution-unperformed destination node on the destination list (step S1603) On receiving this packet, receiving apparatus 1 amends the bit corresponding to itself in destination bit map 1406 to "0", and transfers the packet to receiving apparatus 2 for which "1" indicating a distribution-unperformed destination node is written (step S1604).

In a similar way, router 3 and router 4 transfer a received packet to receiving apparatuses 3 and 4 that are both distribution-unperformed destination nodes (steps S1606 and S1608).

Thus, according to the method described in Patent Document 2, by combining an explicit multicast and a unicast, the same data can be distributed to all receiving apparatuses without packet looping occurring on the broadcast media.

Non-patent Document 1: Y. Imai, M. Shin and Y. Kim, "XCAST6: eXplict Multicast on IPv6", IEEE/IPSJ SAINT 2003 Workshop 4, IPv6 and Applications, Orland, January 2003

Patent Document 1: Japanese Patent Application Laid-Open No. 2000-354063

Patent Document 2: US Patent Application Laid-Open No. 2003/0046425 Specification

DISCLOSURE OF INVENTION

Problems to be Solved by the Invention

However, a problem with the conventional method disclosed in Patent Document 2 is that, even when the same packet is transmitted to a plurality of receiving apparatuses and routers connected to a broadcast media, transmission is performed individually by means of a unicast, and therefore broadcast media communication band consumption is high.

It is an object of the present invention to provide a packet transmitting method, relay node, and receiving node that enable an explicit multicast packet to be transmitted while suppressing broadcast media communication band consumption.

Means for Solving the Problems

A packet transmitting method of the present invention determines a transfer destination of an explicit multicast packet containing a destination list in which addresses of a plurality of destination nodes are written, based on the destination list, and has: a group classification step of a first node classifying a destination node whose address is written in the destination list into a destination group that transmits by means of a unicast to a next hop node, or a destination group that transmits by means of a link level multicast to a next hop node; a transmitting step of the first node transmitting an explicit multicast packet by means of a unicast or a link level multicast in accordance with a classification by the group classification step; and a reverse transfer inhibition step of a second node, on receiving an explicit multicast packet by means of the link level multicast, transferring the packet only to a distribution-unperformed destination node whose address is written in a destination list contained in the packet, the distribution-unperformed destination node being located on the side of an interface other than an interface that received the packet.

Also, a relay node of the present invention determines a transfer destination of an explicit multicast packet containing a destination list in which addresses of a plurality of destination nodes are written based on the destination list, and employs a configuration having: a multicast determining section that determines whether or not a destination IP address of a received explicit multicast packet is a registered link level multicast address; a transmission group classification section that, for an explicit multicast packet whose destination IP address has been determined to be a registered link level multicast address, determines a transfer destination interface whereby that packet is sent based on a destination address written in a destination list contained in that packet and a routing table, and for each transfer destination interface other than an interface that received that packet, classifies a destination node whose address is written in a destination list contained in that packet into a destination group that transmits by means of a unicast to a next hop node, or a destination group that transmits by means of a link level multicast to a next hop node; a packet generating section that generates an explicit multicast packet by changing a destination list contained in the received packet so that only a destination node classified as in the link level multicast destination group is valid and setting a link level multicast address for a destination address of that packet, and also generates an explicit multicast packet by determining a next hop node that relays to a destination node classified as in the unicast destination group based on the route table, changing a destination list contained in the received packet so that only a relay-destination destination node of that next hop node is valid and setting an address of that next hop node for a destination address of that packet; and a transmitting section that transmits an explicit multicast packet generated by the packet generating section from a transfer destination interface determined for that packet by the transmission group classification section to a valid destination node of that packet.

Also a receiving node of the present invention determines a transfer destination of an explicit multicast packet containing a destination list in which addresses of a plurality of destination nodes are written based on the destination list, and employs a configuration having: a multicast determining section that determines whether or not a destination IP address of a received explicit multicast packet is a registered link level multicast address; a transmission determining section that inhibits transfer of the explicit multicast packet whose destination IP address has been determined to be a registered link level multicast address, and also amends its own address among valid destination addresses of a destination list contained in an explicit multicast packet whose destination IP address has been determined not to be a registered link level multicast address to invalid, and then enables transmission of that packet to a node of one of the remaining valid destination addresses; a receiving section that receives an inquiry as to whether or not there is a function that inhibits transfer of an explicit multicast packet whose destination IP address is a registered link level multicast address; a route management section that responds that there is the function in response to the inquiry; and a transmitting section that transmits an explicit multicast packet whose transmission has been enabled by the transmission determining section by means of a unicast to one of the destination nodes indicated by a valid destination address of a destination list contained in that packet.

Advantageous Effect of the Invention

According to the present invention, a packet no longer loops on a broadcast link, and it is possible to perform distribution by means of a link level multicast even in XCAST packet transmission. By this means, broadcast media communication band consumption is suppressed to the utmost, and an XCAST packet (explicit multicast packet) can be distributed efficiently.

BRIEF DESCRIPTION OF DRAWINGS

FIG. 7 is a drawing showing the contents of an XCAST packet transmitted from a router according to an embodiment of the present invention, in which

FIG. 9 is a drawing showing the structure of a routing table and address table according to this embodiment, in which FIG. 9A is a drawing showing the structure of a routing table, and FIG. 9B is a drawing showing the structure of an address table;

FIG. 10 is a format diagram of a Neighbor Solicitation message and Neighbor Advertisement message according to this embodiment, in which

FIG. 11 is a drawing showing the data configuration of entry information recorded in a transfer destination cache according to this embodiment, in which FIG. 11A is a drawing showing the configuration of a transfer destination cache entry, FIG. 11B is a drawing showing the data configuration of a transfer destination entry, FIG. 11C is a drawing showing the data configuration of an LMC entry, and FIG. 11D is a drawing showing the data configuration of a unicast entry;

BEST MODE FOR CARRYING OUT THE INVENTION

An embodiment of the present invention will now be described in detail with reference to the accompanying drawings.

Figure 1:
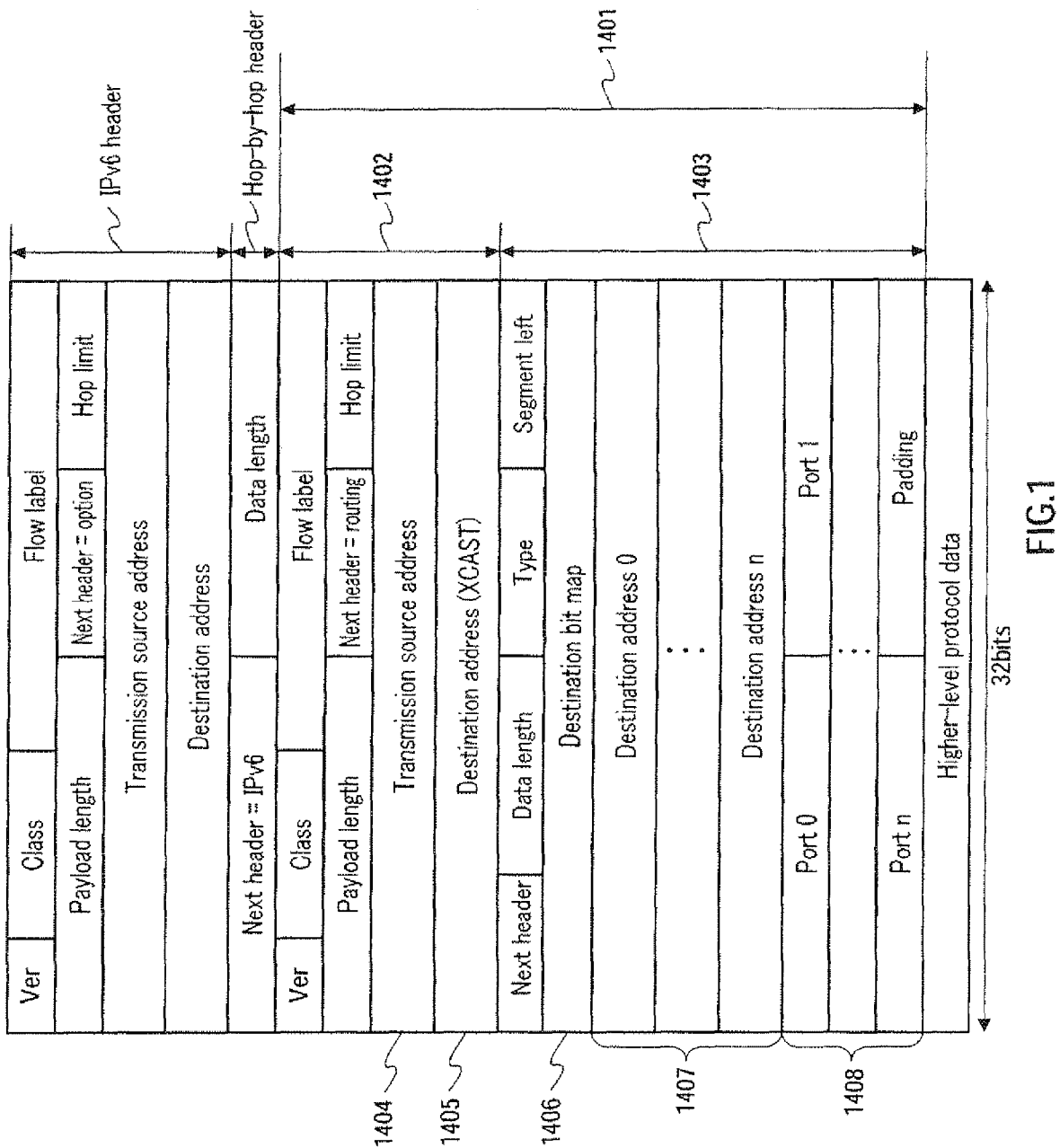
FIG. 1 is a format diagram of a conventional XCAST6 packet.
Figure 2:
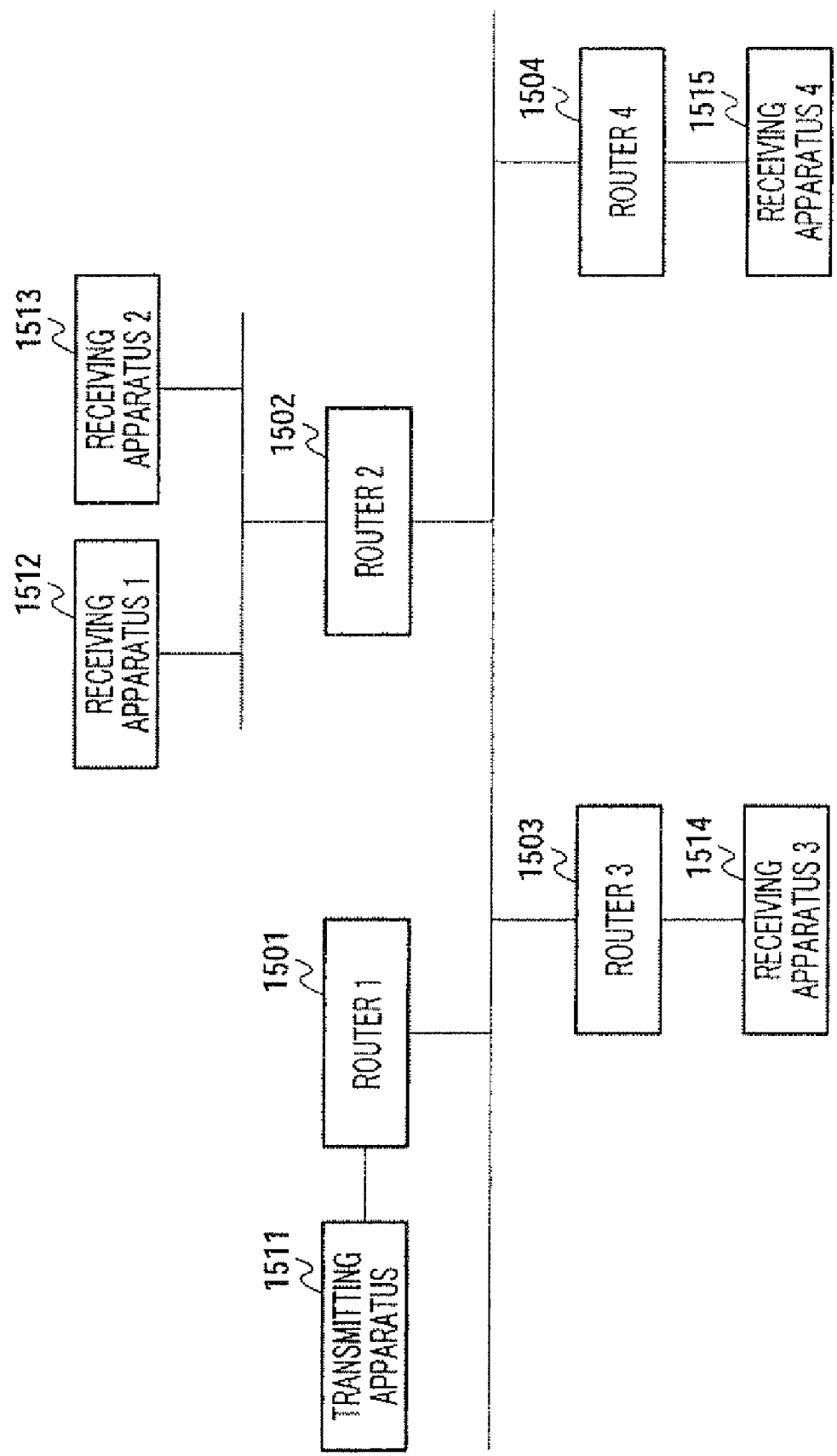
FIG. 2 is a configuration diagram of a conventional IP network.
Figure 3:
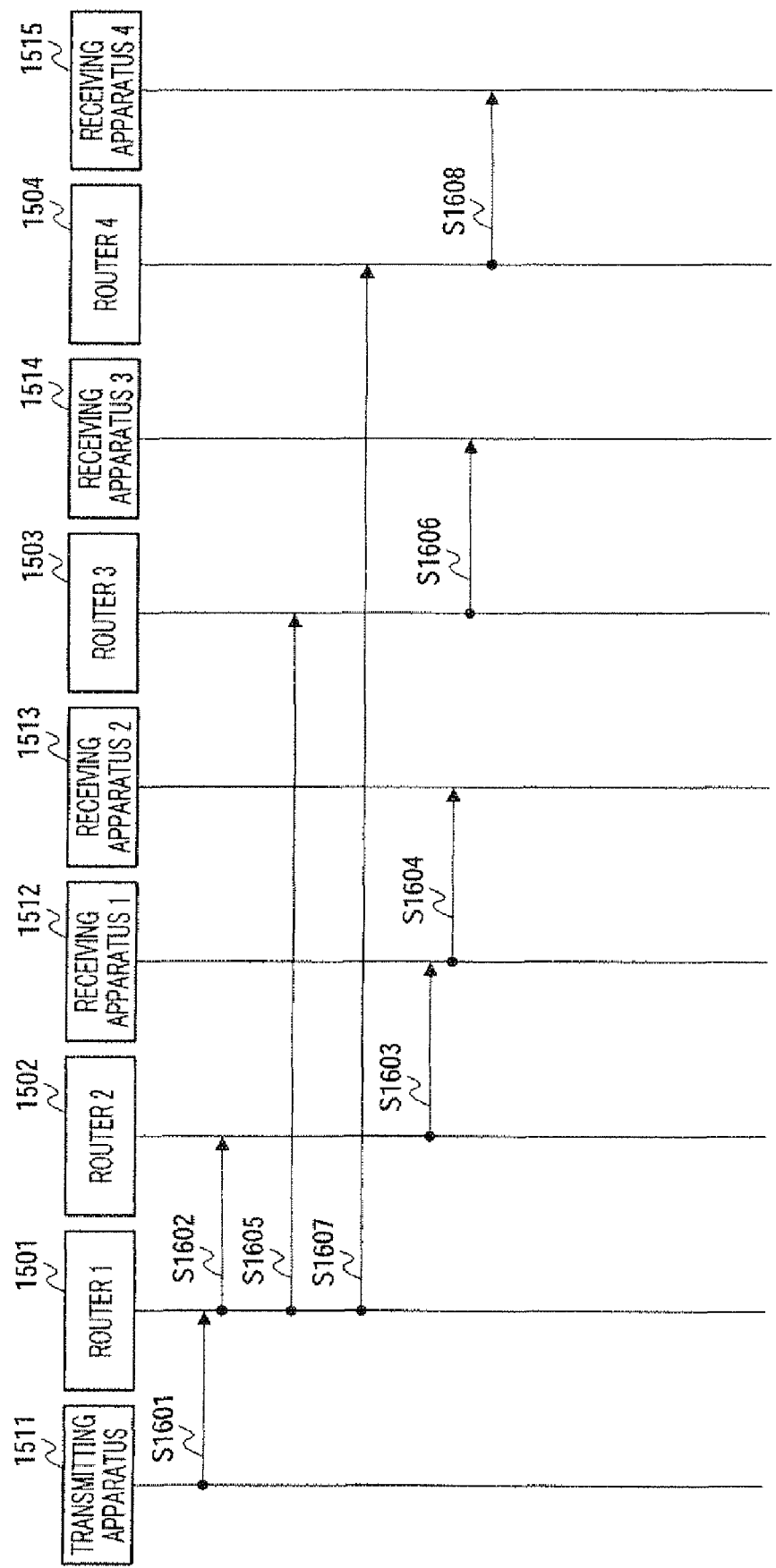
FIG. 3 is a sequence diagram showing a data distribution operation by means of a conventional XCAST.
Figure 4A:
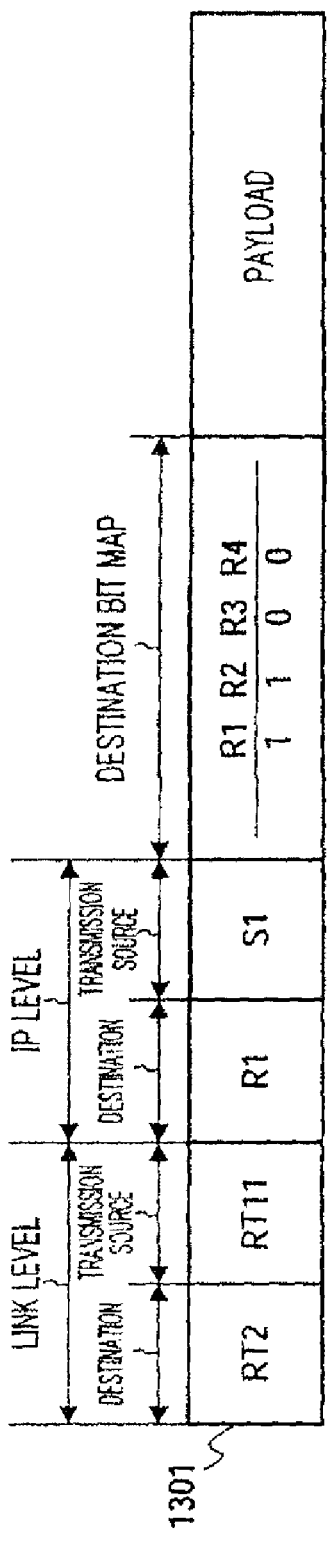
FIG. 4 is a drawing showing the contents of a unicast packet transmitted from a conventional router.
Figure 4B:
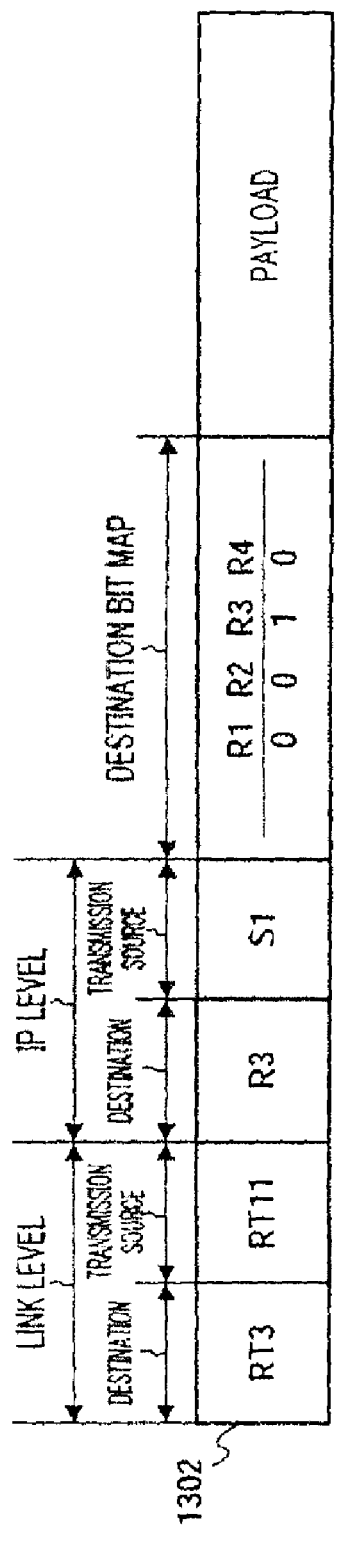
Figure 4C:
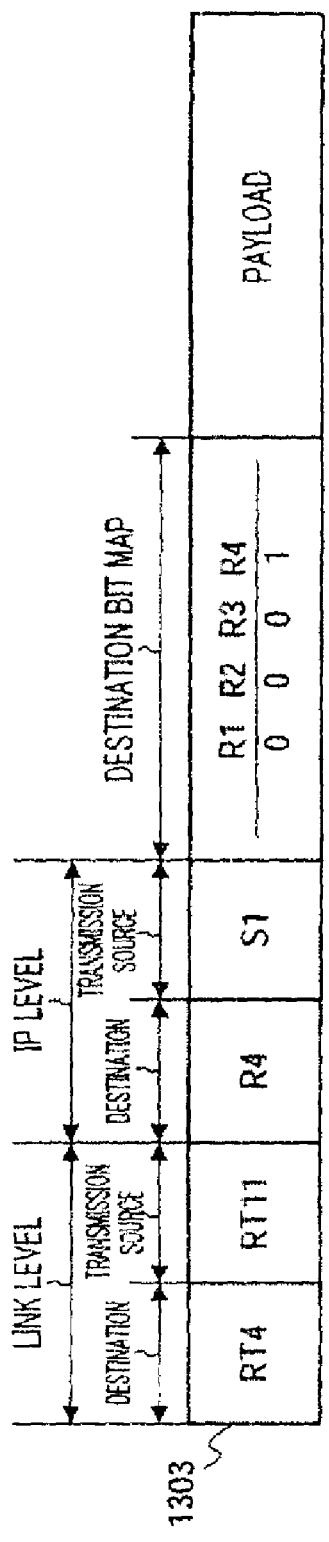
Figure 5:
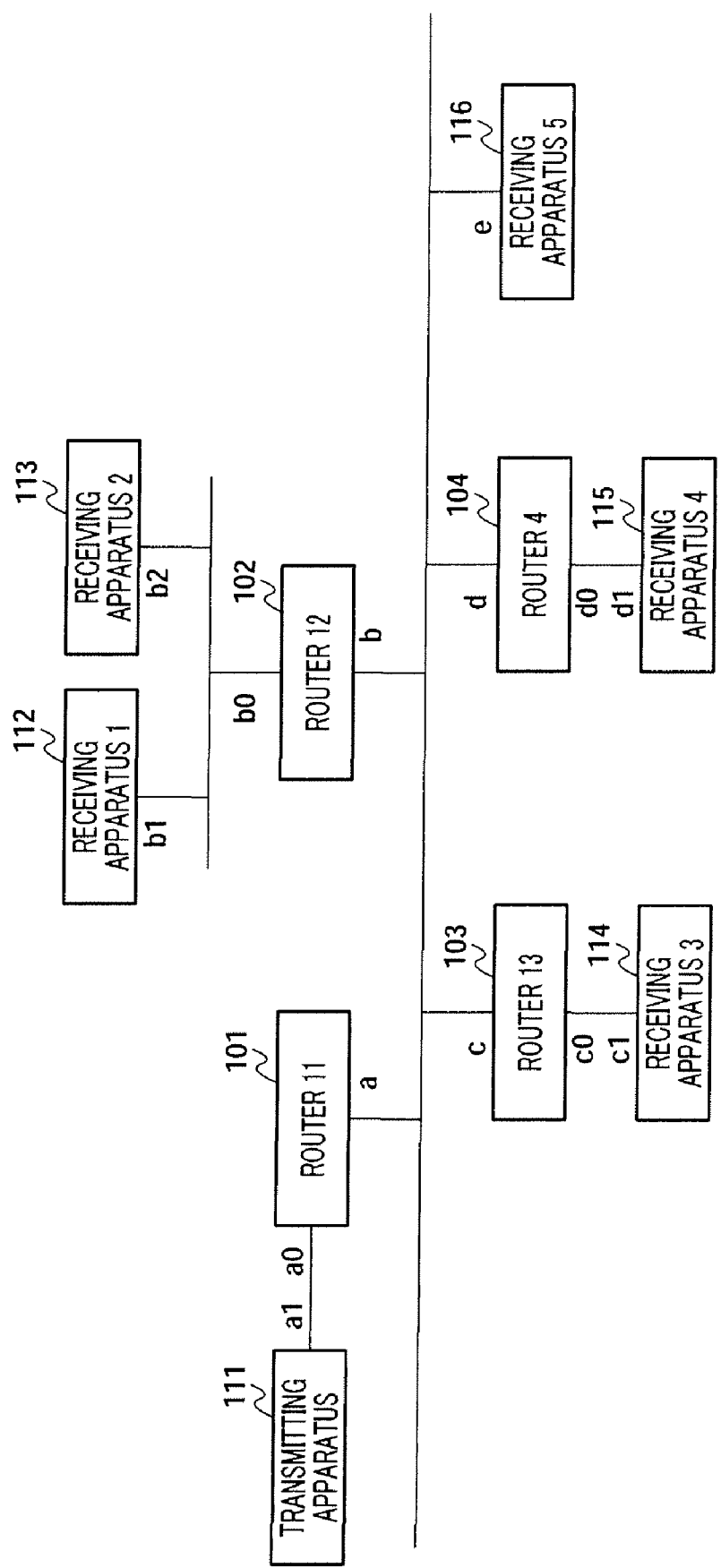
FIG. 5 is a configuration diagram of an IP network using a packet transmitting method according to an embodiment of the present invention.

FIG. 5 is a drawing showing the configuration of an IP network using a packet transmitting method according to this embodiment.

In FIG. 5, routers 11 through 13 (101 through 103) are routers supporting a packet transmitting method of the present invention (hereinafter referred to as "LMC-compatible"), and router 4 (104) is a conventional router supporting an XCAST. A transmitting apparatus (111) and receiving apparatuses 1 through 4 (112 through 115) support an XCAST, and receiving apparatus 5 (116) is an LMC-compatible receiving apparatus. The transmitting apparatus (111) is connected to router 11 (101). Receiving apparatuses 1 and 2 (112 and 113) are on the same broadcast media as router 12 (102). Receiving apparatus 3 (114) is connected to router 13 (103). Receiving apparatus 5 (116) is located on the broadcast media to which routers 4 and 11 through 13 (104, 101 through 103) are connected.

The operation when the transmitting apparatus (111) distributes the same data to receiving apparatuses 1 through 5 (112 through 116) by means of an XCAST packet at this time will now be described using the accompanying drawings.

Figure 6:
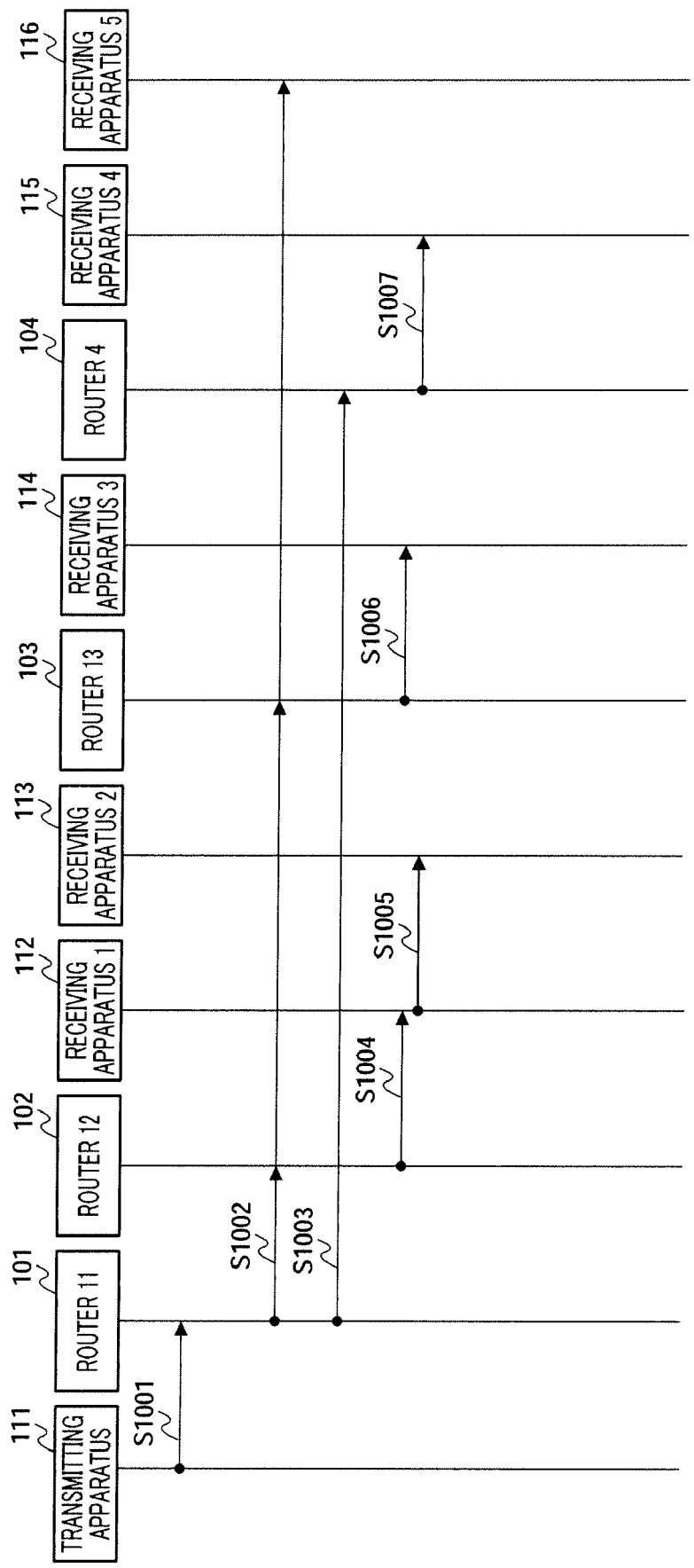
FIG. 6 is a sequence diagram showing a packet transfer operation according to this embodiment.

FIG. 6 is a sequence diagram showing a packet transfer operation from a transmitting apparatus to receiving apparatuses.

In FIG. 6, the transmitting apparatus (111) transmits an XCAST packet in which the addresses of receiving apparatuses 1 through 5 (112 through 116) are written in the destination list to router 11 (101) (step S1001).

Router 11 (101) replicates the received XCAST packet, amends the destination bit map of the destination list, and transmits that packet to routers 12 and 13 (102, 103) and receiving apparatus 5 (116), which are LMC-compatible next hop nodes, by means of a link level multicast (step S1002).

Figure 7A:
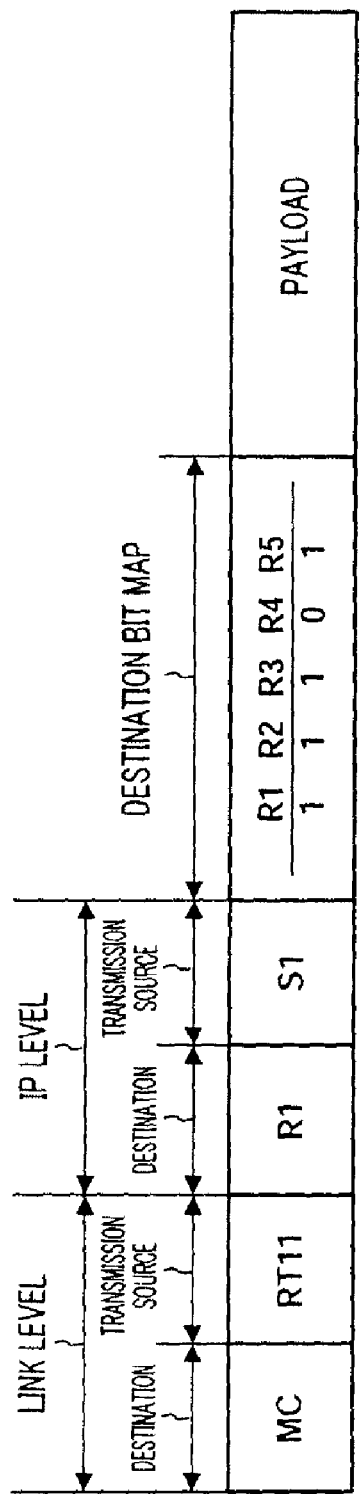
FIG. 7A is a drawing showing the contents of a link level multicast packet transmitted from a router.

FIG. 7A is a drawing showing the contents of an XCAST packet (link level multicast packet) transmitted from router 11 (101) by means of a link level multicast. A preset multicast address (MC) is written as the XCAST packet destination address. In the destination bit map, only bits corresponding to receiving apparatuses 1 through 3 (112 through 114) and receiving apparatus 5 (116) which are relay-destinations of router 12 and 13 (102, 103) are set to "1".

Also, router 11 (101) transmits an XCAST packet to router 4 (104) supporting a conventional XCAST by means of a unicast (step S1003 in FIG. 6).

Figure 7B:
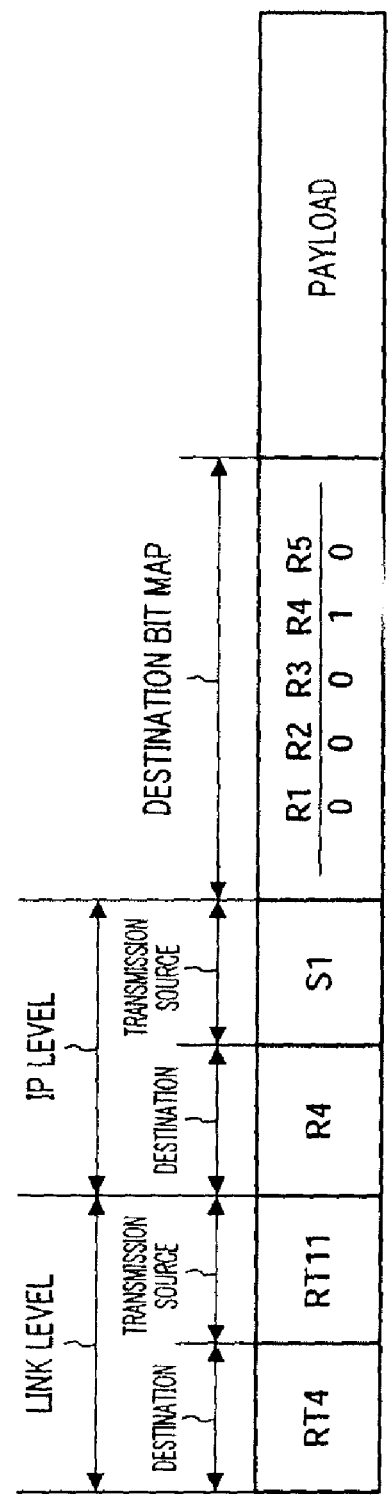
FIG. 7B is a drawing showing the contents of a unicast packet transmitted from a router.

FIG. 7B is a drawing showing the contents of an XCAST packet (unicast packet) transmitted from router 11 (101) by means of a unicast. Next hop node router 4 is written as the XCAST packet destination address. In the destination bit map, only the bit corresponding to receiving apparatus 4 (115) which is relay-destination of router 14 (104) is set to "1".

Next, router 12 (102) receives this, and transmits the received XCAST packet to receiving apparatus 1 (112), which is the distribution-unperformed destination node at the top of the destination list, by means of a unicast (step S1004 in FIG. 6). This is because receiving apparatuses 1 and 2 (112 and 113) are not LMC-compatible nodes, but nodes that support an ordinary XCAST. Assume that router 12 (102) transmitted an XCAST packet by means of a link level multicast. In this case, receiving apparatus 1 (112) would replicate the received packet and transfer it to receiving apparatus 2 (113), which is a distribution-unperformed destination node, and receiving apparatus 2 (113) would replicate the received packet and transfer it to receiving apparatus 1 (112), which is also a distribution-unperformed destination node. As a result, receiving apparatus 1 (112) and receiving apparatus 2 (113) would receive the same data twice. Performing unicast transmission as described above enables such a situation to be prevented.

Next, receiving apparatus 1 (112) receives the XCAST packet transmitted to its own address by means of a unicast, replicates this packet, and transfers it to receiving apparatus 2 (113), which is a distribution-unperformed destination node (step S1005).

On receiving an XCAST packet by means of a link level multicast from router 11 (101), router 13 (103) transfers that packet to receiving apparatus 3 (114) (step S1006).

Also, on receiving an XCAST packet by means of a unicast from router 11 (101), router 4 (104) transfers the received packet to receiving apparatus 4 (115) in accordance with the conventional XCAST stipulation (step S1007).

As described above, on receiving an XCAST packet by means of a link level multicast, routers 12 and 13 (102, 103), which are relay nodes according to the present invention, do not transfer the XCAST packet to a distribution-unperformed destination node from the reception interface. This so-called reverse path suppression function enables repeated transfers of an XCAST packet on a single broadcast media to be prevented. An LMC-compatible node is a node that has a reverse path suppression function.

Also, if there are a plurality of LMC-compatible nodes in broadcast media, router 11 (101) according to the present invention performs packet transmission to these nodes by means of a link level multicast, and performs packet transmission by means of a unicast to a node that is not LMC-compatible. By this means, router 11 (101) can make efficient use of a communication band in broadcast media.

Next, a router and receiving apparatus according to the present invention that make the above-described packet transmitting method possible will be described with reference to the accompanying drawings.

Figure 8:
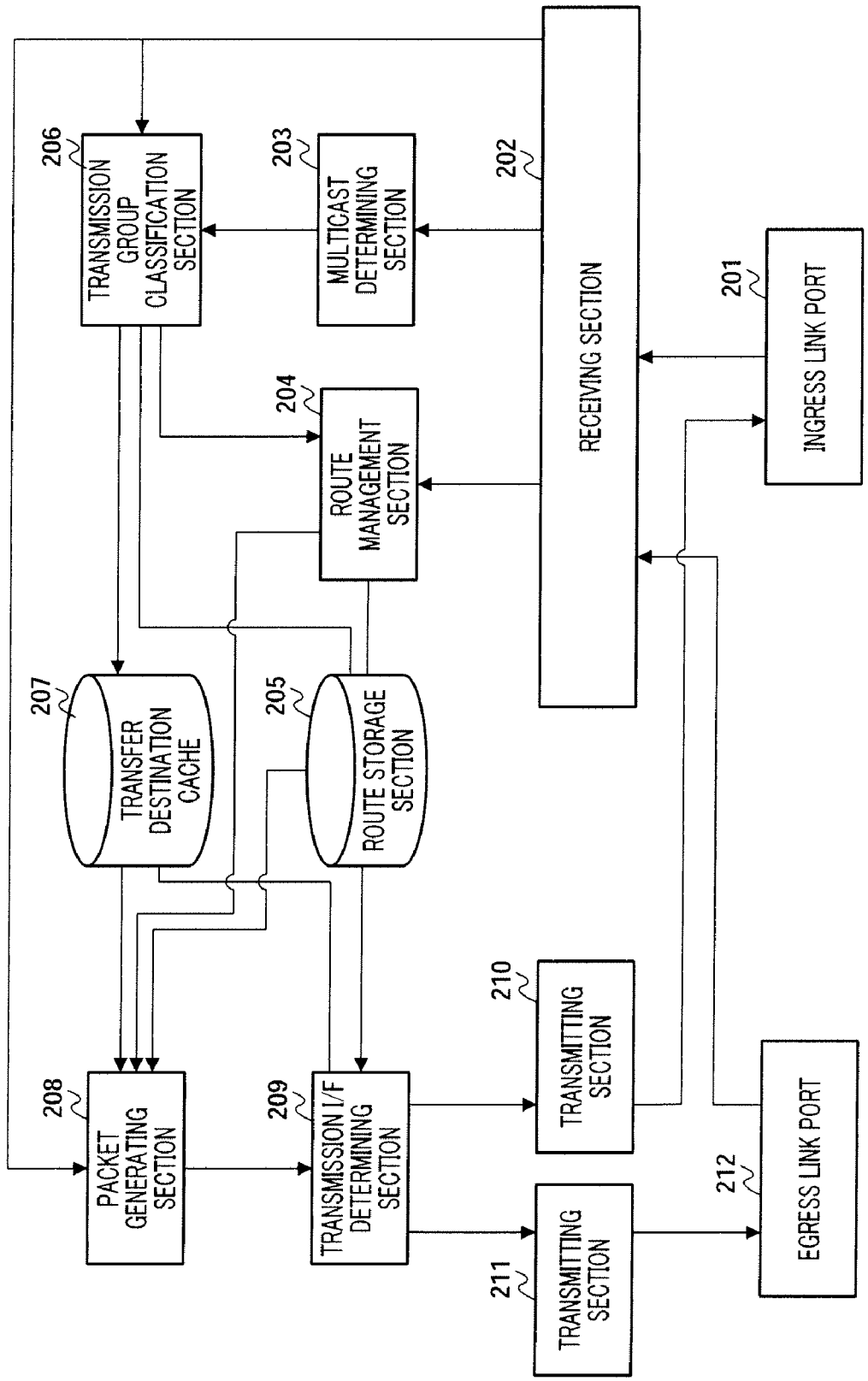
FIG. 8 is a block diagram showing the configuration of a router according to this embodiment.

FIG. 8 is a block diagram showing the configuration of a router according to the present invention, corresponding to routers 11 through 13 (101 through 103) shown in FIG. 5. While the configuration of router 11 (101) will be described here, routers 12 and 13 (102, 103) also have the same configuration.

In FIG. 8, router 11 (101) has ingress link port 201, receiving section 202, multicast determining section 203, route management section 204, route storage section 205, transmission group classification section 206, transfer destination cache 207, packet generating section 208, transmission I/F determining section 209, transmitting section 210, transmitting section 211, and egress link port 212.

First, ingress link port 201, egress link port 212, receiving section 202, transmitting section 211, transmitting section 210, and multicast determining section 203 will be described.

Ingress link port 201 is an input/output port that connects to a local area network (LAN) to which a transmitting apparatus and receiving apparatus are connected.

Egress link port 212 is an input/output port that connects to an Internet or suchlike uplink.

Receiving section 202 receives packets from ingress link port 201 and egress link port 212.

Transmitting section 210 sends a packet to ingress link port 201.

Transmitting section 211 sends a packet to egress link port 212.

Multicast determining section 203 determines whether or not a received packet is an XCAST explicit multicast packet. If a received packet is an XCAST explicit multicast packet, multicast determining section 203 extracts a destination list from the received packet. On the other hand, if a received packet is a packet sent by means of a link local multicast, multicast determining section 203 reports reception interface information to transmission group classification section 206.

Next, route management section 204 will be described.

Route management section 204 generates a Neighbor Solicitation message, inquires after neighboring node route information, and receives a Neighbor Advertisement message. Route management section 204 reflects route information acquired by means of an inquiry in a routing table and address table, and stores and manages this information in route storage section 205. Route management section 204 also simultaneously inquires whether or not a next hop node is LMC-compatible, and records and manages the acquired information in an address table of route storage section 205. Also, when an inquiry as to LMC compatibility/incompatibility is received from another node, route management section 204 responds by generating a Neighbor Advertisement massage.

FIG. 9 shows the structure of a routing table and address table stored by route storage section 205. FIG. 9A is a drawing showing the structure of a routing table stored by route storage section 205, and FIG. 9B is a drawing showing the structure of an address table stored by route storage section 205.

As shown in FIG. 9A, in routing table 400, the IP address of a destination receiving apparatus is recorded in an object node 401 field, and the IP address of a next hop node is recorded in a next hop node 402 field.

Also, as shown in FIG. 9B, in address table 410, the address of a node on broadcast media to which the router itself (router 11) is connected is recorded in a next hop node 411 field, the MAC address of each node is recorded in a MAC address 412 field, a flag indicating whether or not there is compatibility with the packet transmitting method of the present invention is recorded in an LMC compatibility 413 field, and the link interface to which each node is connected is recorded in a connection port ID 414 field. In this embodiment, the flag is set to "1" in the LMC compatibility 413 field in the case of LMC compatibility, and is set to "0" in the case of LMC incompatibility. Also, "2" is set in the connection port ID 414 field in the case of an egress link connection port, and "1" is set in the case of an ingress link connection port.

FIG. 10 shows a Neighbor Solicitation massage and Neighbor Advertisement massage used in this embodiment.

Figures 10A, 10B:
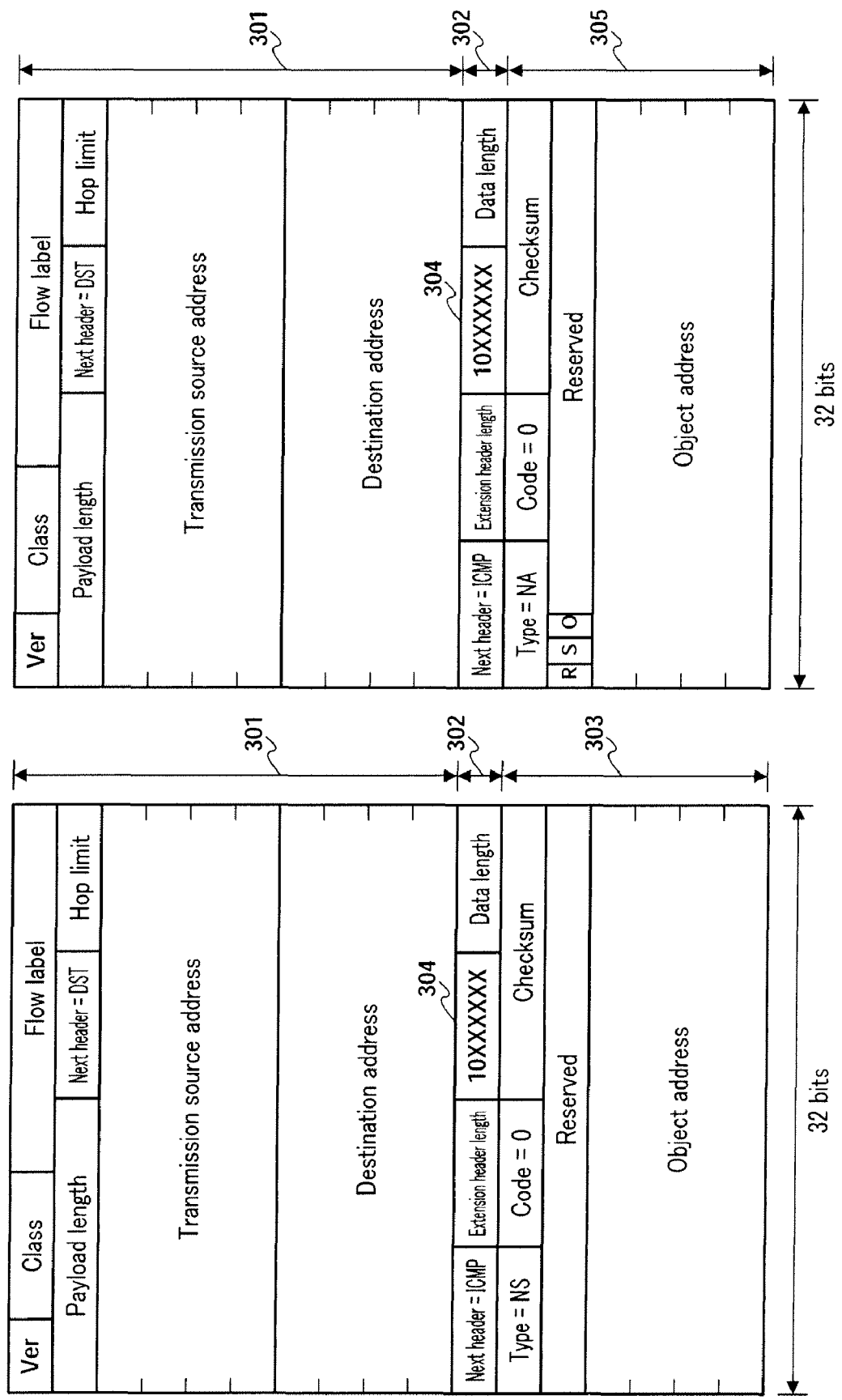
FIG. 10A is a format diagram of a Neighbor Solicitation massage.
FIG. 10B is a format diagram of a Neighbor Advertisement message.

FIG. 10A is a format diagram of a Neighbor Solicitation massage, and FIG. 10B is a format diagram of a Neighbor Advertisement massage.

As shown in FIG. 10A, a Neighbor Solicitation massage according to this embodiment has IPv6 header 301 and destination option header 302 stipulated by RFC2460 added to ICMPv6 Neighbor Solicitation massage 303 stipulated by RFC2461.

Destination option 304 in destination option header 302 uses a "10" code in the first 2 bits. Thus, an LMC-incompatible node that receives a Neighbor Solicitation massage, being unable to interpret this code, returns an ICMPv6 Parameter Problem massage. This is because the IPv6 destination option header specification stipulates as a mandatory operation that a node that receives a Neighbor Solicitation massage is to return a Parameter Problem massage if unable to interpret destination option 304. Document RFC2460 stipulating the IPv6 specification stipulates four kinds of operation when an unknown option header is received. Which of the four kinds of operation is to be performed when an unknown option header is received is stipulated by the first 2 bits of the option header number. In this embodiment, an option number corresponding to "Return ICMP Parameter Problem" is used, with the first 2 bits stipulated as binary "10". By using this option number, the prompt return of a Parameter Problem massage is guaranteed even if an LMC-incompatible node receives a Neighbor Solicitation massage according to this embodiment.

As shown in FIG. 10B, a Neighbor Advertisement massage according to this embodiment has IPv6 header 301 and destination option header 302 stipulated by RFC2460 added to ICMPv6 Neighbor Advertisement massage 305 stipulated by RFC2461.

As with a Neighbor Solicitation massage, Destination option 304 uses a "10" code in the first 2 bits.

This concludes a description of the function of route management section 204.

Next, transmission group classification section 206 will be described.

Transmission group classification section 206 collects together distribution-unperformed destination nodes written in a destination list extracted by multicast determining section 203 as transfer destination entries for each transfer destination interface, and classifies these into an LMC entry group and a unicast entry group. Here, an LMC entry group is a group of destination nodes supporting (compatible with) an LMC, and a unicast entry group is a group of destination nodes not supporting (incompatible with) an LMC.

Specifically, transmission group classification section 206 searches for a next hop node corresponding to a distribution-unperformed destination node based on routing table 400, and then finds connection port ID 414 corresponding to a next hop node obtained by searching based on address table 410. In this way, transmission group classification section 206 finds the transfer destination interface of all destination nodes for which distribution has not been performed, and collects together the distribution-unperformed destination nodes as transfer destination entries for each transfer destination interface.

Furthermore, transmission group classification section 206 classifies those transfer destination entries into a group of destination nodes supporting an LMC (an LMC entry group) and a group of destination nodes not supporting an LMC (a unicast entry group), and records this as entry information in transfer destination cache 207. In addition, when notified of reception port information from multicast determining section 203, transmission group classification section 206 records that reception port information in transfer destination cache 207 as a reception interface (I/F). If there is no reception port information report from multicast determining section 203, a NULL code is recorded.

FIG. 11 shows the data configuration of entry information recorded in transfer destination cache 207.

FIG. 11A is a configuration diagram of a transfer destination cache entry. As shown in FIG. 11A, transfer destination cache entry 500 is composed of transfer destination entry 501, LMC entry 502, unicast entry 503, and reception I/F 504. This transfer destination cache entry 500 is recorded for each transferred packet. Also, port information reported from multicast determining section 203 is recorded in reception I/F 504. In this embodiment, "1" indicating an ingress link port ID or "2" indicating an egress link port ID is recorded.

FIG. 11B is a configuration diagram of transfer destination entry 501. As shown in FIG. 11B, transfer destination entry 501 is composed of list entry quantity 511 and destination field 512. List entry quantity 511 indicates the total number of destination nodes for which the transfer port is the same among the distribution-unperformed destination nodes written in the destination list of a received packet. The IP addresses of the corresponding destination nodes are recorded in destination field 512. In the example in FIG. 11B, a case is shown in which destination nodes comprising destinations 1 through 4 are recorded as distribution-unperformed nodes, but the number of destination nodes is not limited to this.

FIG. 11C is a configuration diagram of LMC entry 502. As shown in FIG. 11C, LMC entry 502 is composed of LMC list entry quantity 521 and destination field 522. LMC list entry quantity 521 indicates the total number of destination nodes of the LMC entry group, and the IP addresses of the corresponding destination nodes are recorded in destination field 522. In the example in FIG. 11C, a case is shown in which destinations 1, 2, and 4 are recorded.

FIG. 11D is a configuration diagram of unicast entry 503. As shown in FIG. 11D, unicast entry 503 is composed of unicast list entry quantity 531 and destination field 532. Unicast list entry quantity 531 indicates the total number of destination nodes of the unicast entry group, and the IP addresses of the corresponding destination nodes are recorded in destination field 532. In the example in FIG. 11D, a case is shown in which destination 3 is recorded.

As a description format, in addition to FIG. 11B through FIG. 11D it is possible, for example, to express a plurality of IPv6 destination addresses as "2, IPv6 address 1, IPv6 address 2" in text notation, using a comma as a delimiter. In this notation example, the first "2" indicates the number of list entries, and "IPv6 address 1" and "IPv6 address 2" indicate the destinations. This concludes a description of the function of transmission group classification section 206.

Next, packet generating section 208 and transmission I/F determining section 209 will be described.

Packet generating section 208 copies a packet received by receiving section 202 and generates a packet for transfer, and receives a request from route management section 204 and generates a Neighbor Solicitation massage. Furthermore, when transferring an XCAST packet, packet generating section 208 generates a link level unicast packet or multicast packet for each transfer destination interface.

Transmission I/F determining section 209 is a section that determines the output port of a packet generated by packet generating section 208.

The operation and action of a router configured as described above will now be explained.

A characteristic difference between an XCAST packet transmitting method according to the present invention and a conventional XCAST packet transmitting method is that with a conventional XCAST packet transmitting method, processing is performed for each next hop node, whereas with an XCAST packet transmitting method according to the present invention, transmission processing is collected together in transfer destination interface units.

Figure 12:
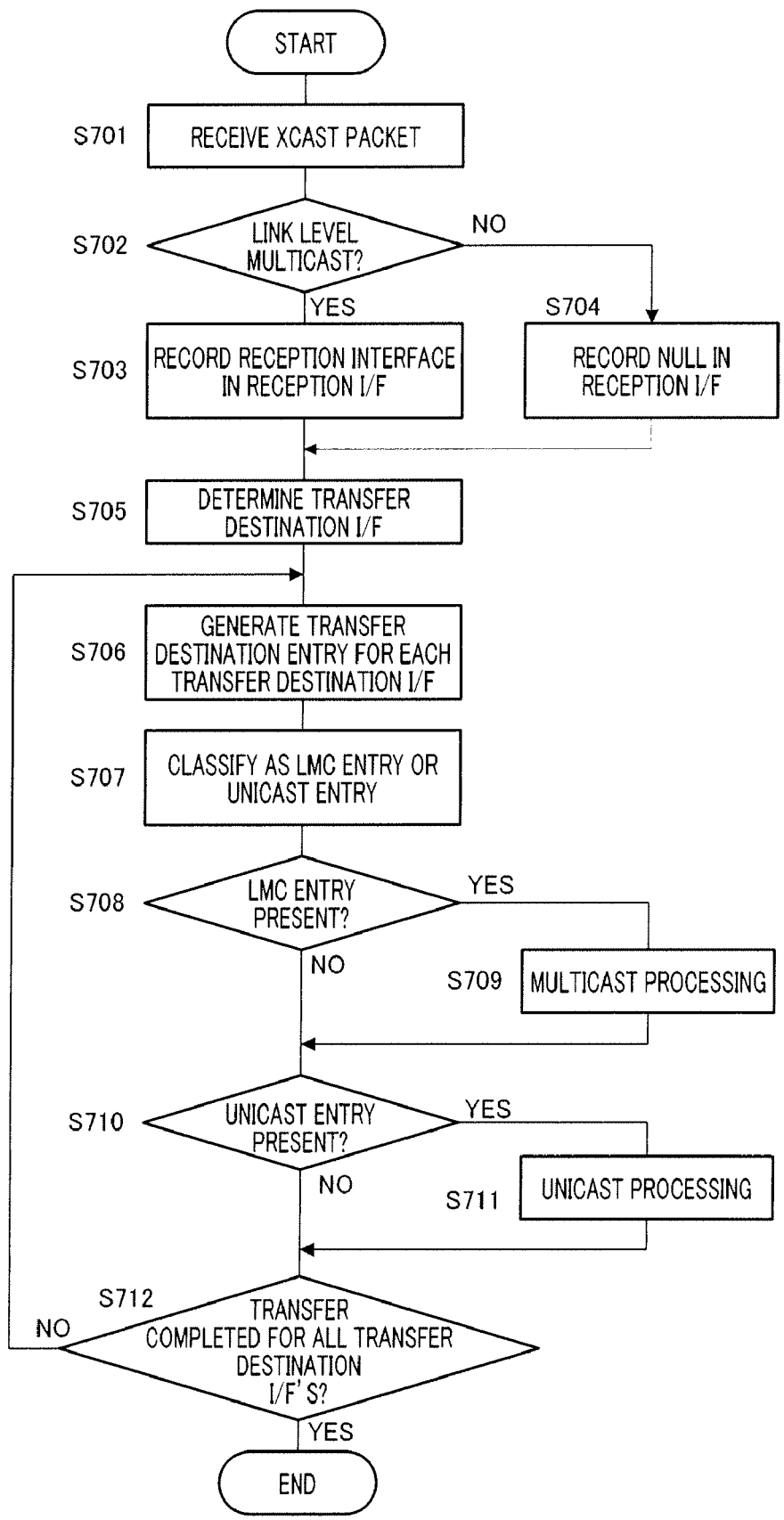
FIG. 12 is a flowchart showing the method whereby a router according to an embodiment of the present invention transfers an XCAST packet.

FIG. 12 is a flowchart showing the method whereby a router according to the present invention transfers an XCAST packet.

In FIG. 12, first, when receiving section 202 receives an XCAST packet from ingress link port 201 or egress link port 212 (step S701), multicast determining section 203 determines whether or not that packet was received by means of a link level multicast (step S702).

If the packet was received by means of a link level multicast (S702: YES), multicast determining section 203 reports that reception interface to transmission group classification section 206, and transmission group classification section 206 records the reported reception interface in reception I/F 504 of transfer destination cache 207 (step S703).

On the other hand, if the terminal itself is the transmitting terminal, or if the packet was received by means of a unicast and not a link level multicast (S702: NO), a report is not made to transmission group classification section 206. Thus, reception interface information is not recorded in reception I/F 504, and NULL is recorded (step S704).

Next, multicast determining section 203 extracts a distribution-unperformed destination node for which destination bit map 1406 is "1", and sends this to transmission group classification section 206. Transmission group classification section 206 receives this, and determines a transfer destination interface (step S705).

Then, when reception interface information other than NULL has been recorded in reception I/F 504, transmission group classification section 206 collects together destination nodes for each transfer destination interface, excluding an interface written in reception I/F 504, and generates transfer destination entry 501 (step S706). Specifically, transmission group classification section 206 writes destination nodes whose transfer destination interface is to be the same in destination field 512, and writes the number of those nodes in list entry quantity 511. If NULL has been written in reception I/F 504, transfer destination entry 501 is generated for all interfaces.

For example, consider a case in which, in the IP network shown in FIG. 5, router 11 (101) performs packet distribution from the transmitting apparatus (111) to receiving apparatuses 1 through 5 (112 through 116) by means of an XCAST. In this case, router 11 (101) detects from routing table 400 and address table 410 that the next hop nodes to receiving apparatuses 1 through 5 (112 through 116) are on the same broadcast media, and collects together receiving apparatuses 1 through 5 (112 through 116) into a single transfer destination entry 501.

As described above, transmission group classification section 206 does not generate transfer destination entry 501 for a destination node to which a next hop node on a connecting link of an output port written in reception I/F 504 relays. Therefore, packet transfer to the reception port is not performed, and reverse transfer is suppressed.

Next, transmission group classification section 206 classifies transfer destination entry 501 as LMC entry 502 or unicast entry 503 (step S707).

For example, based on routing table 400, transmission group classification section 206 of router 11 (101) detects that the next hop node to destination nodes receiving apparatus 1 (112) and receiving apparatus 2 (113) is router 12 (102). Transmission group classification section 206 also detects that the next hop node to receiving apparatus 3 (114) is router 13, and detects that the next hop node to receiving apparatus 4 (115) is router 4 (104). Furthermore, transmission group classification section 206 detects that receiving apparatus 5 (116) is on a broadcast media. Then, based on address table 410, transmission group classification section 206 of router 11 (101) detects that router 12 (102), router 13 (103), and receiving apparatus 5 are LMC-compatible, and that router 4 (104) and the transmitting apparatus (111) are LMC-incompatible.

From these detection results, transmission group classification section 206 of router 11 (101) determines receiving apparatuses 1 through 3 and 5 (112 through 114 and 116) to be in an LMC entry group, and determines receiving apparatus 4 (115) to be in a unicast entry group. Next, packet generating section 208 determines whether or not a destination is written in LMC entry 502 of transfer destination cache 207 (step S708), and if a destination is written (S708: YES), performs multicast processing (step S709).

Then packet generating section 208 determines whether or not a destination node is written in unicast entry 503 of transfer destination cache 207 (step S710) and if a destination node is written (S710: YES), performs unicast processing (step S711).

Next, packet generating section 208 and transmission I/F determining section 209 determine whether or not the transfer processing in above steps S706 through S711 has been completed for all transfer destination cache entries 500 generated for each transfer destination interface, and repeats this processing until so completed (step S712).

The above multicast processing and unicast processing will now be described using the accompanying drawings.

Figure 13:
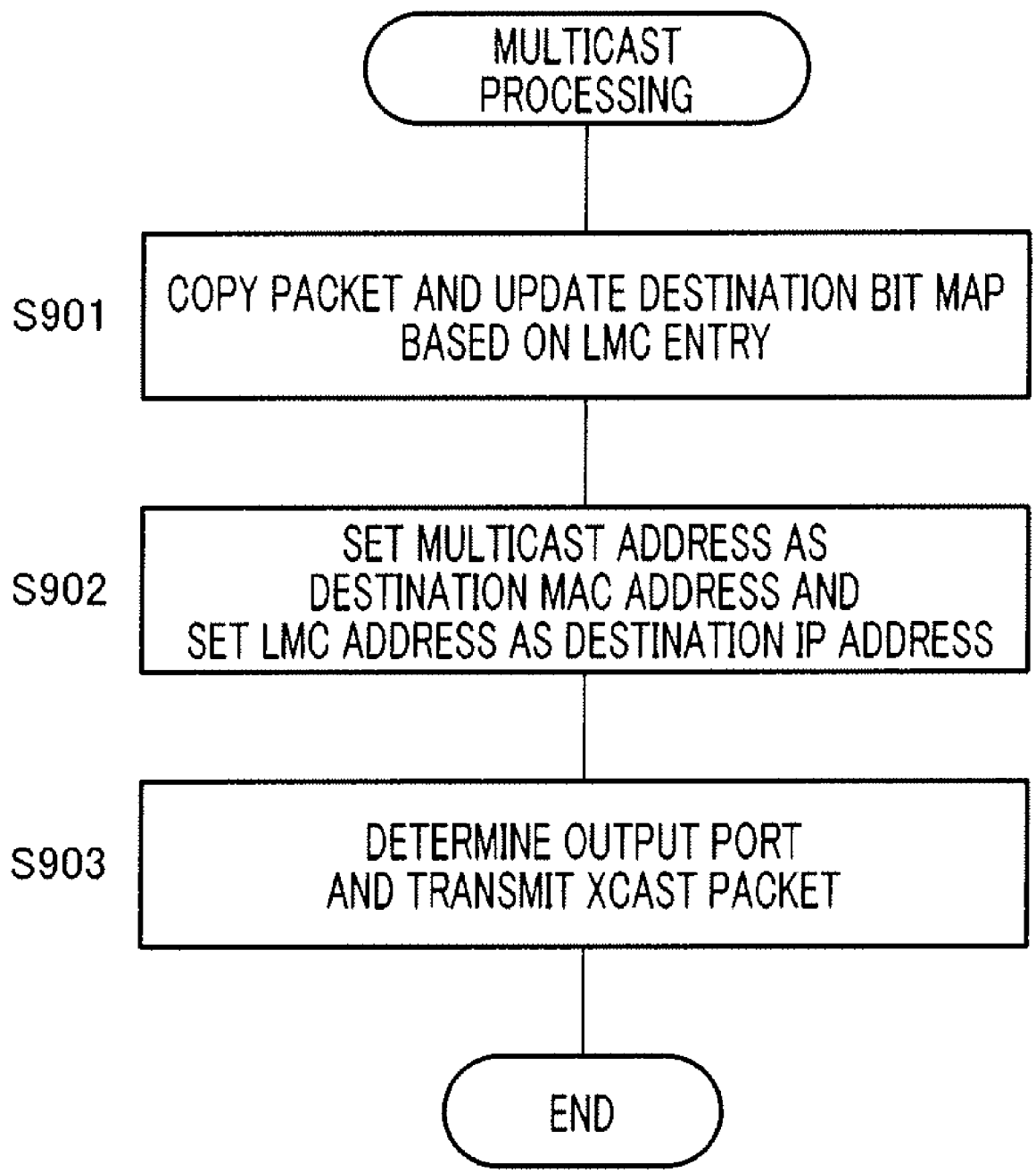
FIG. 13 is a flowchart showing multicast processing according to this embodiment.

FIG. 13 is a flowchart showing details of multicast processing.

First, packet generating section 208 replicates a relevant packet received by receiving section 202, and sets destination bit map 1406 so that only a bit corresponding to an LMC entry 502 destination becomes "1" (step S901).

Also, packet generating section 208 sets a previously stipulated link level multicast address as the destination MAC address, and sets a destination address indicating LMC as the destination IP address (step S902).

Next, transmission I/F determining section 209 receives a transmit packet from packet generating section 208, and determines the output port for the distribution-unperformed destination in destination bit map 1406 based on address table 410. Then transmission I/F determining section 209 transmits an XCAST packet from ingress link port 201 or egress link port 212 via corresponding transmitting section 210 or 211 (step S903).

By this means, an XCAST packet is transmitted to an LMC-compatible distribution-unperformed destination node by means of a link level multicast.

Figure 14:
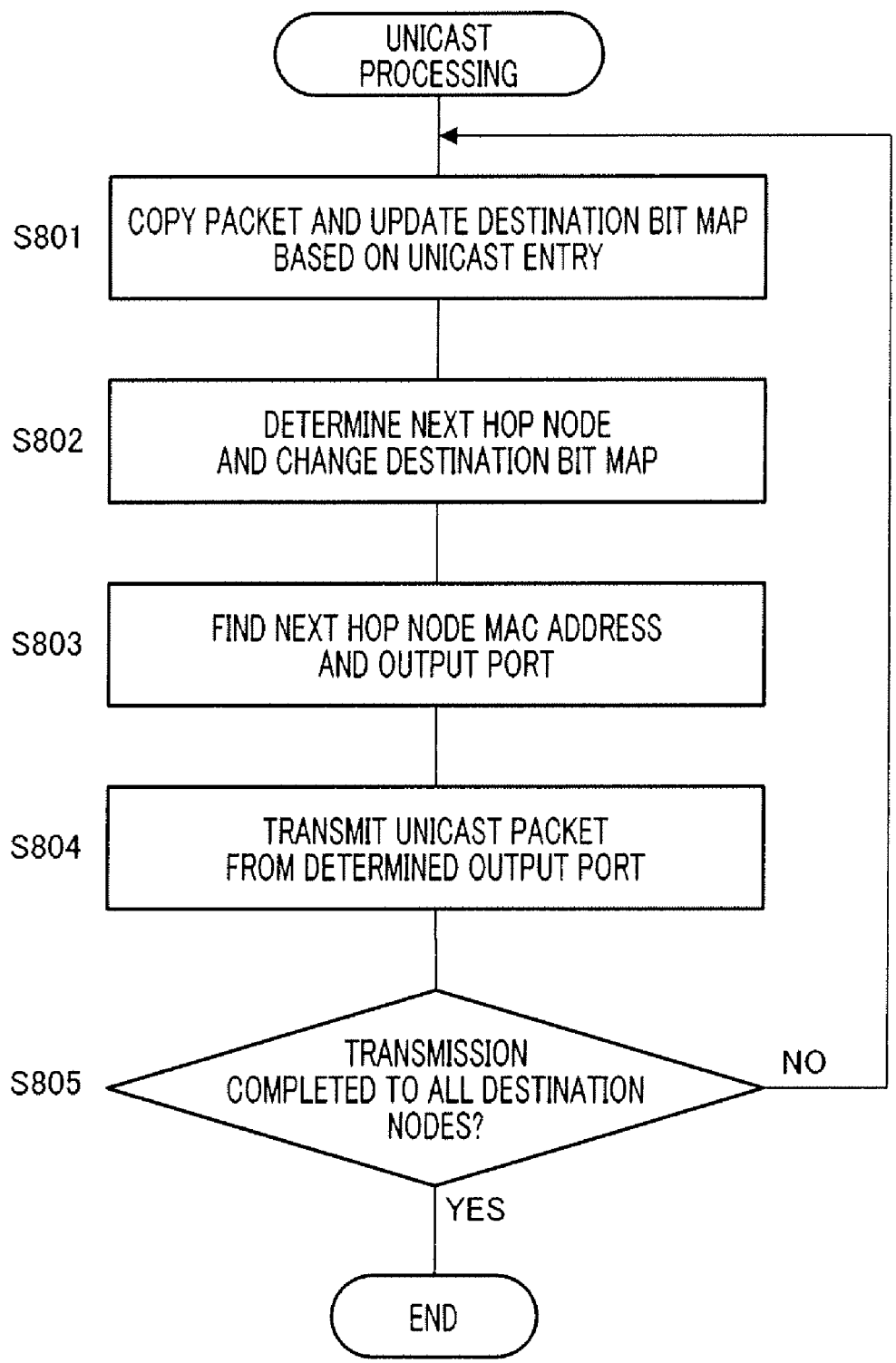
FIG. 14 is a flowchart showing unicast processing according to this embodiment.

FIG. 14 is a flowchart showing details of unicast processing.

In FIG. 14, first, packet generating section 208 replicates a relevant packet received by receiving section 202, and sets destination bit map 1406 so that only a bit corresponding to a unicast entry 503 destination becomes "1" (step S801).

Next, packet generating section 208 references routing table 400, and finds a next hop node corresponding to a destination node written in unicast entry 503. Then packet generating section 208 sets only bits of destination bit map 1406 corresponding to all destination nodes to which the found next hop node relays to "1" (step S802).

Next, packet generating section 208 references address table 410, and finds a MAC address and output port corresponding to that next hop node. Then packet generating section 208 sets the found MAC address as the destination MAC address of a replicated packet, and reports found connection port information to transmission I/F determining section 209 (step S803).

Next, transmission I/F determining section 209 receives a transmit packet from packet generating section 208, and transmits the packet from ingress link port 201 or egress link port 212 via transmitting section 210 or 211 corresponding to the reported connection port (step S804).

Then packet generating section 208 determines whether or not the processing in above steps S801 through S804 has been completed for all destinations written in unicast entry 503, and repeats the above processing until completed for all unicast entry 503 destinations (step S805).

By this means, packet transfer to a destination node that is not compatible with an LMC is performed by means of a unicast to the respective next hop node.

For example, packet generating section 208 of router 11 (101) transmits a packet by means of a link level multicast to router 12 (102), which is the next hop node of receiving apparatuses 1 and 2 (112 and 113), router 13 (103), which is the next hop node to receiving apparatus 3 (114), and receiving apparatus 5 (116), these being LMC-compatible. Also, packet generating section 208 of router 11 (101) transmits a packet by means of a unicast to LMC-incompatible receiving apparatus 4 (115) next hop node router 4 (104).

In step S805, steps S801 through S804 are executed repeatedly for all unicast entry destinations, but this step is also used for a case in which the limit on the number of transfer cache entries is exceeded. That is to say, after the above-described transfer processing using transfer cache ends, a transfer cache entry is generated in order to process a packet having the same header efficiently. It is only possible to hold a limited number of these transfer cache entries. Therefore, an LRU (Least Recently Used) algorithm may be used for transfer cache entries, such as operation whereby appropriate aging is performed using the frequency of use of entries. Alternatively, entries may be maintained using a FIFO (First In First Out) or suchlike algorithm. Another alternative is to perform operation such that unicast processing is performed for all destinations if it becomes necessary to generate a transfer cache entry after the limit on the number of transfer cache entries is exceeded. In this case, the router would abandon transfer cache entry generation, and subsequently would not perform multicast processing or unicast processing based on transfer cache entries in processing of a packet for which there is no transfer cache entry hit.

This concludes a description of the method by which a router according to the present invention transfers an XCAST packet.

Next, address resolution performed when transmission group classification section 206 generates transfer destination cache entry 500 will be described.

If a next hop node MAC address or LMC compatibility information is not recorded in the address table when generating transfer destination cache entry 500, transmission group classification section 206 makes a request for address resolution for the corresponding next hop node to route management section 204.

On receiving this, route management section 204 gives a directive for generation of a Neighbor Solicitation massage for that destination address to packet generating section 208. Packet generating section 208 generates a Neighbor Solicitation massage according to this embodiment for MAC address resolution for the specified destination address, and sends this to transmission I/F determining section 209. On receiving this, transmission I/F determining section 209 transmits a Neighbor Solicitation massage by means of a link local multicast to all output ports via transmitting sections 210 and 211.

If the address of a node on broadcast media receiving a Neighbor Solicitation massage according to this embodiment matches the destination address, that node enables link level multicast reception, and then transmits a Neighbor Advertisement massage. At this time, if route management section 204 of the node for which the destination address matches recognizes that the code written in destination option 304 indicates LMC compatibility, it returns a Neighbor Advertisement massage in which that code is replicated. If unable to recognize that the code written in destination option 304 indicates LMC compatibility, route management section 204 of the node for which the destination address matches returns a Parameter Problem massage.

On receiving a Neighbor Advertisement massage via receiving section 202, route management section 204 of the node that transmitted a Neighbor Solicitation massage according to this embodiment determines whether this is a normal response or a Parameter Problem massage. Then, if a normal response is obtained, route management section 204 registers the reported MAC address in MAC address field 412 of address table 410, and writes "1" indicating compatibility in LMC compatibility field 413.

On the other hand, if a Parameter Problem massage is received, route management section 204 registers the reported MAC address in MAC address field 412 of address table 410, and writes "0" indicating incompatibility in LMC compatibility field 413.

By this means, it is possible for a router according to the present invention to acquire information relating to nodes on broadcast media necessary for classifying transfer destination entries into an LMC entry group and a unicast entry group.

In this embodiment it has been assumed that when next hop node address resolution is performed, an inquiry as to LMC compatibility or incompatibility is also made together with this, but the present invention is not limited to this, and an inquiry as to LMC compatibility or incompatibility may also be made in a separate sequence from address resolution.

Also, a Neighbor Solicitation massage and Neighbor Advertisement massage according to this embodiment have been stipulated by using an IPv6 destination option header, but the present invention is not limited to this, and an independent message may also be used. In this case, when a destination node does not support this Neighbor Solicitation massage, it may not respond. Therefore, the transmitting node performs time-out processing if there is no response within a certain time period, and on timing-out performs the same processing as when a negative response is received.

Furthermore, in this embodiment, a link level multicast address used when distributing a packet by an LMC (link level multicast distribution method) by means of a packet transmitting method according to the present invention has been described as being a preset multicast address, but the present invention is not limited to this. For example, provision may be made for an unused multicast address to be secured using an SAP (Session Announcement Protocol) that confirms the multicast address usage situation, prior to packet distribution by means of an LMC, and for that multicast address to be used. Alternatively, provision may be made for an unused multicast address to be acquired using MADCAP stipulated by RFC2132 or an extended version of DHCP stipulated by RFC2131, RFC2132, or RFC3315, and for that to be used.

This concludes a description of the configuration and operation of a router according to the present invention.

Next, the configuration of a receiving apparatus according to the present invention will be described using the accompanying drawings.

Figure 15:
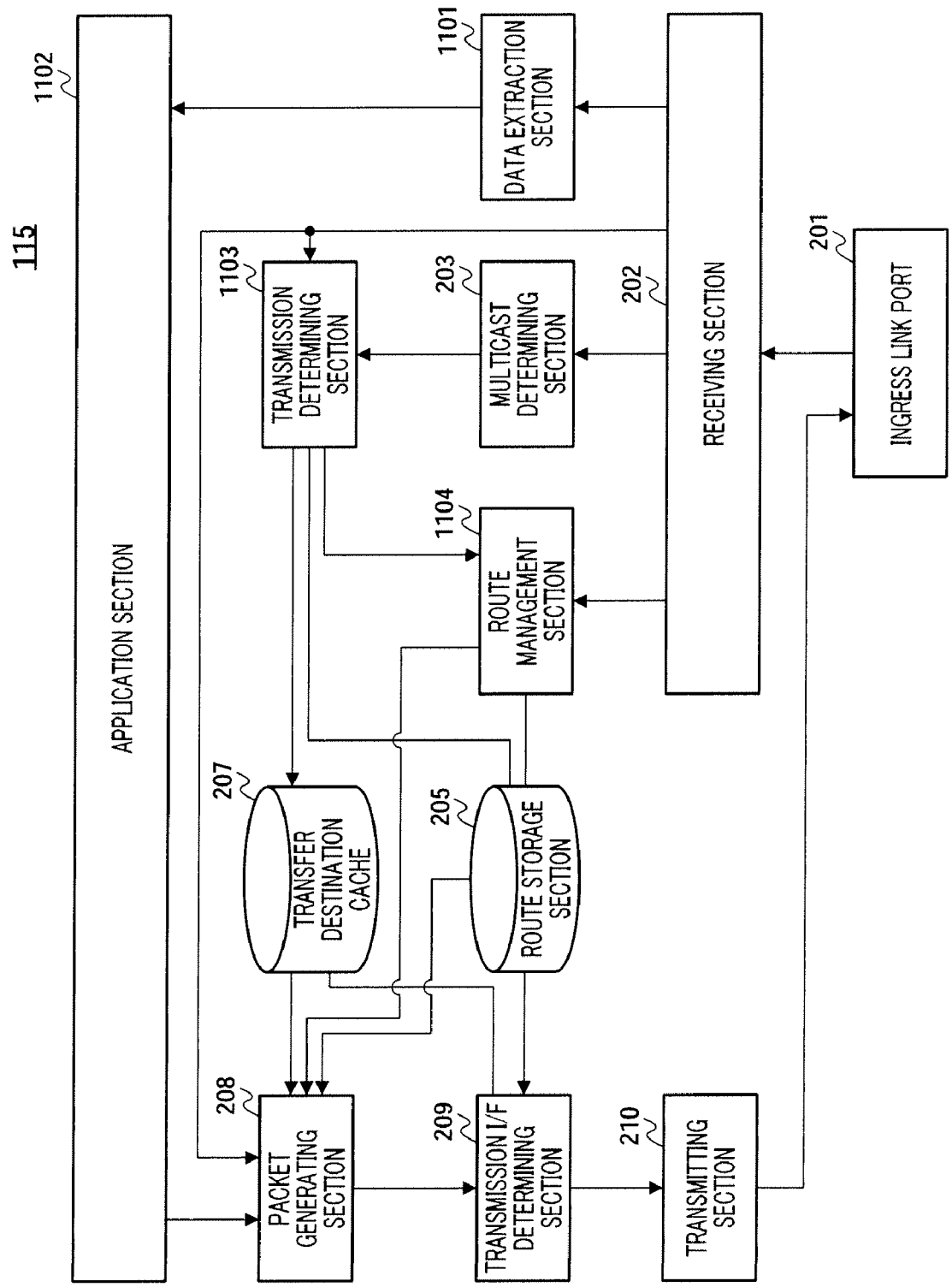
FIG. 15 is a block diagram showing the configuration of a receiving apparatus according to this embodiment.

FIG. 15 is a block diagram showing the configuration of receiving apparatus 4, corresponding to FIG. 8. Parts in FIG. 15 identical to those in FIG. 8 are assigned the same reference codes as in FIG. 8, and descriptions thereof are omitted here.

In FIG. 15, receiving apparatus 4 (115) has ingress link port 201, receiving section 202, multicast determining section 203, route storage section 205, transfer destination cache 207, packet generating section 208, transmission I/F determining section 209, transmitting section 210, data extraction section 1101, application section 1102, transmission determining section 1103, and route management section 1104.

Data extraction section 1101 extracts data from a received packet. Application section 1102 performs application processing.

On receiving a report that an explicit multicast packet has been received by means of a link level multicast from multicast determining section 203, transmission determining section 1103 inhibits transfer of the received explicit multicast packet.

Unlike route management section 204 according to the present invention shown in FIG. 8, route management section 1104 manages a MAC address and connection port of another receiving apparatus on broadcast media by means of an address table, and does not have a routing table. Also, when an inquiry as to LMC compatibility/incompatibility is received from a router according to the present invention by means of a Neighbor Solicitation massage, route management section 1104 gives a response indicating LMC compatibility by means of a Neighbor Advertisement massage.

The other configuration blocks are the same as those of a router according to the present invention.

The method whereby a receiving apparatus configured as described above transfers an XCAST packet will now be explained.

Figure 16:
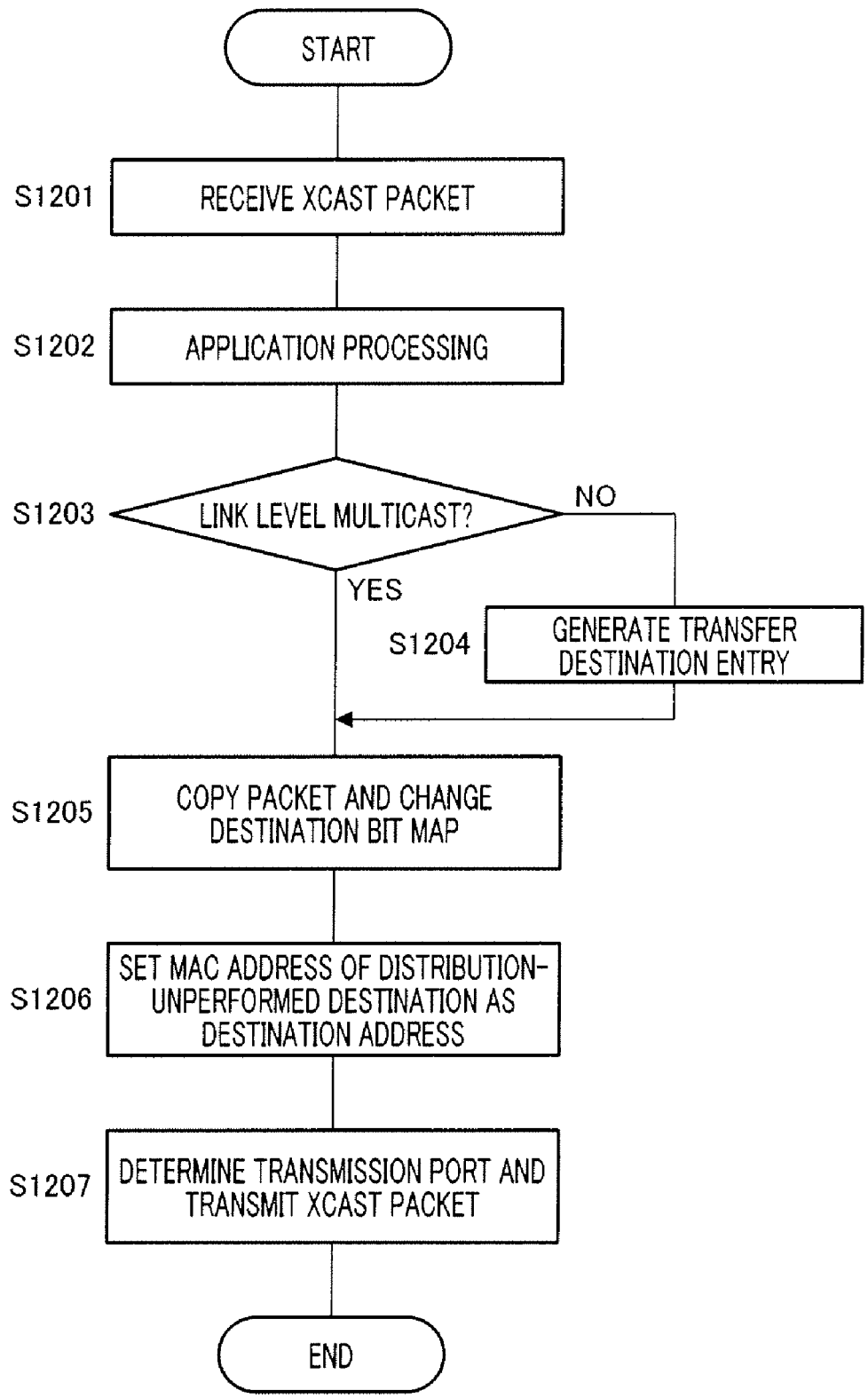
FIG. 16 is a flowchart showing the method whereby a receiving apparatus according to this embodiment transfers an XCAST packet.

FIG. 16 is a flowchart showing the method whereby a receiving apparatus according to the present invention transfers an XCAST packet.

First, if a packet received from the ingress link port is an ordinary data packet (step S1201), receiving section 202 transfers that packet to data extraction section 1101. Data extraction section 1101 extracts data from that received packet and transfers this to application section 1102, and application section 1102 performs application processing using the received data (step S1202).

If a received packet is an XCAST packet, multicast determining section 203 determines whether or not the destination address is a previously stipulated multicast address (step S1203), and reports the result to transmission determining section 1103.

Next, if packet reception by means of a link level multicast is reported by multicast determining section 203 (S1203: YES), transmission determining section 1103 does not perform generation of a transfer destination entry for transfer destination cache 207 even in the case of XCAST packet reception. On the other hand, if reception of an XCAST packet by means of a unicast is reported by multicast determining section 203 (S1203: NO), transmission determining section 1103 updates its own bit to "0" in the destination bit map of the destination list contained in the XCAST packet, and generates a transfer destination entry in transfer destination cache 207 from a destination for which "1" is set in the destination bit map (step S1204).

Then, if a distribution-unperformed destination transfer destination entry has been recorded in transfer destination cache 207, packet generating section 208 replicates the received packet and changes the destination bit map so that only the destination of a transfer destination entry becomes "1" (step S1205). Also, packet generating section 208 selects the distribution-unperformed destination address at the start of the destination bit map, and searches for the corresponding MAC address based on the address table. Then packet generating section 208 sets the MAC address found from the search as the destination address (step S1206).

Next, transmission I/F determining section 209 determines the connection port corresponding to the destination address based on the address table, and transmits the generated XCAST packet to corresponding transmitting section 210 (step S1207). In this embodiment there is only one transmitting section 210, and therefore transmission I/F determining section 209 is not essential.

As described above, according to a receiving apparatus according to the present invention, when an XCAST packet is received by means of a link level multicast, reverse transfer to another receiving apparatus on broadcast media is suppressed, enabling packet looping on the broadcast media to be prevented.

Also, since a receiving apparatus according to the present invention gives a response indicating LMC compatibility by means of a Neighbor Advertisement massage, if there is an LMC-compatible receiving apparatus on broadcast media, a router that is a relay node according to the present invention can transmit an XCAST packet by means of a link level multicast, including that receiving apparatus.

Moreover, according to a transmitting method according to the present invention, a relay node according to the present invention can acquire information as to whether or not each node on the same broadcast media is LMC-compatible, enabling distribution-unperformed destination nodes to be classified into a group of destination nodes for which a next hop node is LMC-compatible and a group of destination nodes for which a next hop node is LMC-incompatible destination nodes. Since a router that is a relay node according to the present invention can transmit an XCAST packet to a next hop node by means of a link level multicast, it is possible to use a communication band efficiently.

Also, since a router that is a relay node according to the present invention can transmit a packet to an LMC-incompatible next hop node by means of a unicast, packet looping on the broadcast media can be prevented.

A packet transmitting method according to a first aspect of the present invention determines a transfer destination based on a destination list in which a plurality of destination addresses are written. That is to say, a first node performs classification into a destination group that transmits by means of a unicast to a next hop node, and a destination group that transmits by means of a link level multicast. This destination group that transmits by means of a unicast is a group of next hop nodes that relay an explicit multicast packet to a destination node of a destination list. The first node transmits an explicit multicast packet by means of a unicast or a link level multicast in accordance with that classification. Then a second node, on receiving an explicit multicast packet transmitted by means of a link level multicast, transfers the explicit multicast packet only to a distribution-unperformed destination node written in a destination list located on the side of an interface other than the interface that received it.

Consequently, the same packet no longer loops on a broadcast link, and it is possible to perform distribution by means of a link level multicast even in XCAST packet transmission. As a result, communication band consumption can be reduced by transmitting an XCAST packet by means of a unicast a plurality of times.

According to a second aspect of the present invention, in a packet transmitting method according to the first aspect, the first node inquires of a next hop node whether it has a reverse transfer inhibition function. As described above, this reverse transfer inhibition function is a function whereby, when an XCAST packet is received by means of a link level multicast, it is not transferred from the interface that received the packet. Then, when a next hop node responds that it has a reverse transfer inhibition function in response to that inquiry, the first node, in the above classification, regards a relay-destination destination node to which the next hop node that responded in this way as belonging to the link level multicast destination group. A destination node responding otherwise is classified into the unicast destination group.

By this means, the first node can classify destination nodes on a destination list into a group in which an XCAST packet may be transmitted by means of a link level multicast and a group in which the XCAST packet must not be transmitted.

According to a third aspect of the present invention, in a packet transmitting method according to the second aspect, the first node further classifies a destination node written in a destination list for each interface to a link to which a next hop node corresponding to that destination node is connected. Then the first node performs destination group classification for each transfer destination interface.

By this means, even if there are a plurality of transfer destination interfaces, a link level multicast can be performed for each transfer destination interface, making it possible to distribute XCAST packets to destination nodes efficiently.

According to a fourth aspect of the present invention, in a packet transmitting method according to the second aspect, the first node determines a next hop node that relays to a destination node belonging to the unicast destination group based on a routing table, and changes the destination list so that only a destination node that is a relay destination of that next hop node is valid. Then the first node transmits an explicit multicast packet containing the changed destination list to that next hop node by means of a unicast.

By this means, if a destination node that is a relay destination of a next hop node belongs to the unicast destination group, the first node can transmit XCAST packets by means of a unicast in next hop node units.

According to a fifth aspect of the present invention, in a packet transmitting method according to the second aspect, the first node changes the destination list so that only a destination node classified into the multicast destination group is valid. Then the first node transmits an explicit multicast packet containing the changed destination list by means of a multicast.

By this means, the first node can transmit an XCAST packet by means of a link level multicast to a group for which XCAST packet transmission by means of a link level multicast may be performed.

According to a sixth aspect of the present invention, in a packet transmitting method according to the second aspect, the first node acquires an unused link level multicast address. Then the first node, when transmitting an explicit multicast packet by means of a link level multicast, transmits it with the link level multicast address set as a destination IP address.

By this means, the first node can use a multicast address without duplication.

A relay node according to a seventh aspect of the present invention determines a transfer destination based on a destination list in which a plurality of destination addresses are written. More particularly, a relay node of the present invention has a multicast determining section, a transmission group classification section, a packet generating section, and a transmitting section.

The multicast determining section determines whether or not a destination IP address of a received explicit multicast packet is a registered link level multicast address. When the multicast determining section has determined a destination IP address to be a registered link level multicast address, the transmission group classification section determines a transfer destination interface whereby the received packet is sent based on a destination address written in a destination list and a routing table. Then, for each transfer destination interface other than the interface that received that explicit multicast packet, the transmission group classification section classifies a destination of the destination list into a destination group that transmits an explicit multicast packet to a next hop node by means of a unicast, or a destination group that transmits by means of a link level multicast.

The packet generating section changes a destination list contained in a received packet so that only a destination of the multicast destination group is valid. Then the packet generating section sets a multicast address as the destination address, or determines a next hop node that relays to a destination node belonging to the unicast destination group based on the routing table. Furthermore, the packet generating section changes the destination list so that only a relay-destination destination node of that next hop node is valid, and sets the address of that next hop node as the destination address.

The transmitting section transmits an explicit multicast packet generated by the packet generating section from a transfer destination interface corresponding to a valid destination node of that explicit multicast packet determined by the transmission group classification section.

By this means, a relay node can distribute an XCAST packet by means of a link level multicast so that the same packet does not loop on a broadcast link. As a result, broadcast media communication band consumption can be reduced.

According to an eighth aspect of the present invention, in a relay node according to the seventh aspect, a route management section is further provided. This route management section inquires of a node on broadcast media whether or not it has a function whereby, when an explicit multicast packet is received by means of a link level multicast, that explicit multicast packet is not transferred in the reverse direction to the receiving interface. Then, a next hop node responding that it has a function for not performing reverse transfer in response to that inquiry is classified into the multicast destination group. The transmission group classification section classifies a next hop node that responds otherwise into the unicast destination group.

By this means, a relay node can classify destination nodes on a destination list into a group that may transmit an XCAST packet by means of a link level multicast and a group that must not.

A receiving node according to a ninth aspect of the present invention determines a transfer destination based on a destination list in which a plurality of destination addresses are written. More particularly, a receiving node of the present invention has a multicast determining section, a transmission determining section, a receiving section, a route management section, and a transmitting section.

The multicast determining section determines whether or not a destination IP address of a received explicit multicast packet is a registered link level multicast address. When the multicast determining section has determined a destination IP address to be a registered link level multicast address, the transmission determining section inhibits explicit multicast packet transfer. On the other hand, when the multicast determining section has not determined a destination IP address to be a registered link level multicast address, the transmission determining section amends its own address among valid destination addresses of a destination list contained in the explicit multicast packet to invalid, and enables transmission of that explicit multicast packet to a node of one of the remaining valid destination addresses.

The receiving section receives an inquiry as to whether or not there is a function that inhibits transfer of an explicit multicast packet by the transmission determining section. The route management section responds that there is that function in response to such an inquiry.

When the transmission determining section has determined that an explicit multicast packet can be transmitted, the transmitting section transmits an amended explicit multicast packet by means of a unicast to a node with a valid destination address.

By this means, when an XCAST packet is received by means of a link level multicast, the receiving apparatus suppresses reverse transfer to another receiving apparatus on broadcast media, enabling packet looping on the broadcast media to be prevented.

The disclosure of Japanese Patent Application No. 2006-040572, filed on Feb. 17, 2006, including the specification, drawings and abstract, is incorporated herein by reference in its entirety.

INDUSTRIAL APPLICABILITY

The present invention is useful as a packet transmitting method, relay node, and receiving node that enable an explicit multicast packet to be transmitted while suppressing broadcast media communication band consumption in XCAST packet distribution or the like.

The invention claimed is:

1. A packet transmitting method that determines a transfer destination of an explicit multicast packet containing a destination list in which addresses of a plurality of destination nodes are written based on the destination list, the packet transmitting method comprising:
   a group classification step of a first node classifying a destination node from among the plurality of destination nodes whose address is written in the destination list into a unicast destination group and a link level multicast destination group, the unicast destination group for unicast to a next hop node, the link level multicast destination group for link level multicast to the next hop node;
   a transmitting step of the first node transmitting the explicit multicast packet by the unicast or the link level multicast in accordance with a classification by the group classification step; and
   a reverse transfer inhibition step of a second node, on receiving the explicit multicast packet by the link level multicast, transferring the packet only to a distribution-unperformed destination node whose address is written in the destination list contained in the packet, the distribution-unperformed destination node being located on the side of an interface of the second node other than an interface that received the packet.

2. The packet transmitting method according to claim 1, further comprising:
   an inquiry step of the first node inquiring of the next hop node whether execution of the reverse transfer inhibition step is possible; and
   a response step of the next hop node that receives the inquiry transmitted at the inquiry step responding to the inquiry,
   wherein, in the group classification step, the first node classifies the destination node of a relay destination by the next hop node responding that the execution of the reverse transfer inhibition step is possible in the response step into the link level multicast destination group, and classifies the destination node of the relay destination by the next hop node responding other than that the execution of the reverse transfer inhibition step is possible in the response step into the unicast destination group.

3. The packet transmitting method according to claim 2, further comprising an interface classification step of the first node classifying the destination node whose address is written in the destination list according to an interface to a link to which the next hop node that relays the explicit multicast packet to the destination node is connected,
   wherein, in the group classification step, classification of the destination group is performed for each interface classified by the interface classification step.

4. The packet transmitting method according to claim 2, further comprising:
   a unicast destination group determining step of the first node determining the next hop node that relays to the destination node classified into the unicast destination group based on a routing table; and
   a list changing step of the first node changing the destination list so that only the destination node of a relay destination of the next hop node determined by the unicast destination group determining step is valid,
   wherein, in the transmitting step, the first node transmits the explicit multicast packet containing the destination list changed by the list changing step to the next hop node by the unicast.

5. The packet transmitting method according to claim 2, further comprising a list changing step of the first node changing the destination list so that only the destination node classified into the link level multicast destination group is valid,
   wherein, in the transmitting step, the first node transmits the explicit multicast packet containing the destination list changed by the list changing step to the next hop node by the link level multicast.

6. The packet transmitting method according to claim 2, further comprising an address acquisition step of the first node acquiring an unused address for link level multicast,
   wherein, in the transmitting step, the first node, when transmitting the explicit multicast packet by the link level multicast, transmits the explicit multicast packet with the address for link multicast acquired by the address acquisition step set as a destination IP address.

7. A relay node that determines a transfer destination of an explicit multicast packet containing a destination list in which addresses of a plurality of destination nodes are written based on the destination list, the relay node comprising:
   a multicast determining section that determines whether or not a destination IP address of a received first explicit multicast packet is a registered address for link level multicast;
   a transmission group classification section that, if the destination IP address of the received first explicit multicast packet has been determined to be the registered address for link level multicast, determines, other than an interface that received the first multicast explicit packet, a transfer destination interface which sends the received first explicit multicast packet based on a destination address written in the destination list contained in the received first explicit multicast packet and a routing table, and for the determined transfer destination interface, classifies a first destination node whose address is written in the destination list contained in the received first explicit multicast packet into a unicast destination group and a link level multicast destination group, the unicast destination group for unicast to a next hop node, the link level multicast destination group for a link level multicast to the next hop node;

a packet generating section that generates a second explicit multicast packet by changing the destination list contained in the received first explicit multicast packet so that only a second destination node classified as in the link level multicast destination group is valid and setting an address for link level multicast as destination address of the second explicit multicast packet, and also generates a third explicit multicast packet by determining a next hop node that relays to a third destination node classified as in the unicast destination group based on the routing table, changing the destination list contained in the received first explicit multicast packet so that only a relay-destination destination node of the that next hop node is valid and setting an address of the that next hop node that relays to the third destination node as a destination address of that packet; and a transmitting section that transmits the second or third explicit multicast packet generated by the packet generating section from a transfer destination interface determined for the second or third packet by the transmission group classification section to a valid destination node of the second or third packet.

8. The relay node according to claim 7, further comprising a route management section that inquires of the next hop node on broadcast media whether or not the next hop node has a function whereby, when one of the explicit multicast packets is received by a link level multicast, the explicit multicast packet is not transferred in a reverse direction to a receiving interface of the next hop node, wherein the transmission group classification section classifies a relay-destination destination node of the next hop node responding that it has the function for not performing the reverse transfer in response to the inquiry into the link level multicast destination group, and classifies a relay-destination destination node of the next hop node that gives a response other than that it has the function into the unicast destination group.

9. A receiving node that determines a transfer destination of an explicit multicast packet containing a destination list in which addresses of a plurality of destination nodes are written based on the destination list, the receiving node comprising:

a multicast determining section that determines whether or not a destination IP address of a received explicit multicast packet is a registered address for link level multicast;

a transmission determining section that inhibits a transfer of the explicit multicast packet whose destination IP address has been determined to be the registered address for link level multicast, and, if the destination IP address of the explicit multicast packet has been determined not to be the registered address for the link level multicast, amends its own address among valid destination addresses of a destination list contained in the explicit multicast packet whose destination IP address has been determined not to be the registered address for the link level multicast to be invalid and then enables transmission of the explicit multicast packet having the destination IP address which has been determined not to be the registered address for link level multicast to a node of one of remaining valid destination addresses;

a receiving section that receives an inquiry as to whether or not there is a function that inhibits the transfer of the explicit multicast packet whose destination IP address is the registered address for the link level multicast;

a route management section that responds that there is the function in response to the inquiry; and a transmitting section that transmits the received explicit multicast packet whose transmission has been enabled by the transmission determining section by a unicast to one of the destination nodes indicated by a valid destination address of the destination list contained in the received packet.

* * * * *